United States Patent
Bates et al.

(10) Patent No.: US 10,147,461 B1
(45) Date of Patent: Dec. 4, 2018

(54) SYSTEMS AND METHODS FOR ALERTING USERS TO DIFFERENCES BETWEEN DIFFERENT MEDIA VERSIONS OF A STORY

(71) Applicant: ROVI Guides, Inc., San Jose, CA (US)

(72) Inventors: Adam Bates, Los Gatos, CA (US);
Jesse F. Patterson, Pacifica, CA (US);
Mark K. Berner, Santa Clara, CA (US);
Eric Dorsey, Palo Alto, CA (US);
David W. Chamberlin, Pacifica, CA (US);
Paul Stevens, Felton, CA (US);
Herbert A. Waterman, Merced, CA (US);
William L. Thomas, Evergreen, CO (US)

(73) Assignee: ROVI Guides, Inc., San Jose, CA (US)

( * ) Notice: Subject to any disclaimer, the term of this patent is extended or adjusted under 35 U.S.C. 154(b) by 0 days.

(21) Appl. No.: 15/858,508

(22) Filed: Dec. 29, 2017

(51) Int. Cl.
| | | |
|---|---|---|
| H04N 9/80 | (2006.01) |
| G11B 27/34 | (2006.01) |
| H04N 21/442 | (2011.01) |
| H04N 21/466 | (2011.01) |
| H04N 21/454 | (2011.01) |
| H04N 21/84 | (2011.01) |
| H04N 21/472 | (2011.01) |
| H04N 21/435 | (2011.01) |
| H04N 21/478 | (2011.01) |
| H04N 21/4788 | (2011.01) |
| H04N 5/93 | (2006.01) |
| G11B 27/00 | (2006.01) |

(52) U.S. Cl.
CPC ........... *G11B 27/34* (2013.01); *H04N 21/435* (2013.01); *H04N 21/44218* (2013.01); *H04N 21/4542* (2013.01); *H04N 21/4667* (2013.01); *H04N 21/478* (2013.01); *H04N 21/4788* (2013.01); *H04N 21/47217* (2013.01); *H04N 21/84* (2013.01)

(58) Field of Classification Search
USPC .................................................. 386/248, 278
See application file for complete search history.

(56) References Cited

U.S. PATENT DOCUMENTS

| | | |
|---|---|---|
| 6,239,794 B1 | 5/2001 | Yuen |
| 6,564,378 B1 | 5/2003 | Satterfield |
| 7,165,098 B1 | 1/2007 | Boyer |
| 7,761,892 B2 | 7/2010 | Ellis |

(Continued)

*Primary Examiner* — Nigar Chowdhury
(74) *Attorney, Agent, or Firm* — Haley Guiliano LLP

(57) ABSTRACT

Systems and methods for alerting users to differences between first and second media versions of a story are provided. Given a first version of the media asset, a first sequence of plot segments in the first version that collectively represent a story arc may be identified. A second version of the media asset may be processed to identify a second sequence of plot segments that collectively represent the story arc. The first sequence and second sequence of plot segments may be compared to identify a set of plot segments representing a difference between the sequences. In response to detecting that a user consuming the first version of the media asset has reached a given plot segment that represents a resolution to the story, a summary of the set of plot segments representing the difference between the first and second sequences may be generated for display.

20 Claims, 10 Drawing Sheets

(56) References Cited

U.S. PATENT DOCUMENTS

| | | | |
|---|---|---|---|
| 7,843,454 B1 * | 11/2010 | Biswas | ................... G06T 13/80 |
| | | | 345/473 |
| 8,046,801 B2 | 10/2011 | Ellis | |
| 2002/0174430 A1 | 11/2002 | Ellis | |
| 2005/0010863 A1 * | 1/2005 | Zernik | ................ G06F 17/2211 |
| | | | 715/229 |
| 2005/0251827 A1 | 11/2005 | Ellis | |
| 2010/0070645 A1 * | 3/2010 | Liu | ........................ H04L 47/10 |
| | | | 709/231 |
| 2010/0153885 A1 | 6/2010 | Yates | |
| 2017/0099449 A1 * | 4/2017 | Kang | ................... H04N 5/3765 |

* cited by examiner

SYSTEMS AND METHODS FOR ALERTING USERS TO DIFFERENCES BETWEEN DIFFERENT MEDIA VERSIONS OF A STORY

BACKGROUND

Users often enjoy consuming a story in different digital media content versions, such as through an e-book or a television series. If a popular book series is being adapted into a television show, for example, readers of the book series may be particularly interested in watching the television show and comparing how the story is represented between the two media versions. There will generally be differences between the plotlines of the media versions that users may be interested in being alerted to.

SUMMARY

Accordingly, systems and methods are provided herein for enhancing the user experience by alerting the users to differences in plot points in which the users may have interest. Specifically, while systems exist that generate and process metadata associated with media content, these systems do not use this metadata and other resources to compare different media versions of a given story. A media guidance application as disclosed herein can use this metadata to alert users to differences between first and second media versions of a story, which can contribute to the users' engagement with the story and make for a more enjoyable media consumption experience. Moreover, by using this metadata in a specific way, beyond simply identifying triggers or markers, the media guidance application can generate alerts keyed to specific plot segments.

For example, identifying differences between plot segments (where a plot segment represents the occurrence of an event within a plot that spins the action around in another direction) represents a unique challenge beyond simply detecting difference (e.g., different characters in a scene, different actors portraying the characters, etc.), because the detection of differences in plot segments requires determining a sequence of the plot segments respective to the overall plot. For example, to determine whether a plot segment is different in two versions (as opposed to simply in a different order), the media guidance application must first determine points at which the action associated with given plot segments have concluded. Systems that simply compare generic metadata cannot perform this function. After determining that a plot segment in both versions is concluded, the media guidance application may then determine the differences between two plot segments.

Systems and methods for alerting users to differences between first and second media versions of a story using a media guidance application are provided. For example, the media guidance application may be implemented on user equipment (e.g., a set-top box, a television, an e-reader, a tablet computer, etc.). A user may be interested in consuming the story "Harry Potter and the Sorcerer's Stone," which is available in a movie version and an e-book version. Given a first media asset that is the movie version of the story and a second media asset that is the e-book version of the story, the media guidance application may identify a first sequence of plot segments in the first media asset that collectively represent a story arc. For example, the media guidance application may identify from the movie version of the story a first sequence of plot segments, including Harry arriving at Platform 9¾, Harry meeting Ron and Hermione on the Hogwarts Express, and Harry taking a boat across a lake to the Hogwarts castle, that collectively represent the story arc of Harry's journey to Hogwarts. The media guidance application may process the second media asset to identify a second sequence of plot segments that collectively represent the story arc. For example, the media guidance application may identify from the e-book version of the story a second sequence of plot segments, including Harry meeting Ron, Hermione, and Neville on the Hogwarts Express, Harry buying candy from the lunch trolley on the Hogwarts Express, and Harry taking a boat across a lake to the Hogwarts castle, that collectively represent the story arc of Harry's journey to Hogwarts.

The media guidance application may compare the first sequence of plot segments with the second sequence of plot segments to identify a set of plot segments that represent a difference between the first and second sequences. While a user is consuming the first media asset, for example by watching the movie version of "Harry Potter and the Sorcerer's Stone," the media guidance application may detect that the user has reached a given plot segment of the first sequence of plot segments that represents a resolution to the story arc. For example, the media guidance application may detect that the user has reached the plot segment of Harry entering the Hogwarts castle, which the media guidance application has identified as the given plot segment that represents a resolution to the story arc of Harry's journey to Hogwarts. In response to detecting that the user has reached the given plot segment, the media guidance application may generate for display a summary of the set of plot segments representing the difference between the first and second sequences of plot segments. This display augments the user's engagement with the story and enhances their overall experience with the media asset.

In some embodiments, the media guidance application may receive a user selection of a media asset. For example, the user may indicate via a user interface a selection of the movie version of "Harry Potter and the Sorcerer's Stone."

The media guidance application may determine that the media asset is available in a first version and a second version. For example, the media guidance application may determine that "Harry Potter and the Sorcerer's Stone" is available in the movie version as a first version and in an e-book version as a second version.

The media guidance application may retrieve a first set of metadata associated with the first version of the media asset, the first metadata identifying a first sequence of plot segments that collectively represent a story arc in the first version of the media asset. For example, the media guidance application may retrieve subtitles of the movie version of "Harry Potter and the Sorcerer's Stone" and use the subtitles to generate a first set of a metadata identifying a first sequence of plot segments that collectively represent the story arc of Harry's journey to Hogwarts. For example, the plot segments may be scenes in the movie that are delineated by changes in location, changes in characters present, changes in character dialogue, etc. In another example, the plot segments may be determined by points in time within the movie. For example, the story arc of Harry's journey to Hogwarts could comprise one plot segment from time 10:00 to time 14:59 in the movie, another plot segment from time 15:00 to time 19:59 in the movie, etc.

The media guidance application may retrieve a unique identifier associated with the story arc in both the first version and the second version of the media asset. For example, the unique identifier may be the action of Harry entering the Hogwarts castle, which is associated with the story arc of Harry's journey to Hogwarts in both the movie version and the e-book version of the story.

The media guidance application may determine a first plot segment in the first sequence represents a resolution to the story arc in the first version of the media asset based on detecting the unique identifier. For example, the media guidance application may determine the first plot segment representing a resolution to the story arc of Harry's journey to Hogwarts to be the scene in which Harry walks into the Hogwarts castle, based on detecting the unique identifier (the action of Harry entering the castle in the movie). For example, detecting the action of Harry entering the castle in the movie could involve parsing the subtitles of the scene. In another example, detecting the action could be accomplished using machine vision analysis on the video.

The media guidance application may retrieve a second set of metadata associated with the second version of the media asset, the second metadata identifying a second sequence of plot segments that collectively represent the story arc in the second version of the media asset. For example, the media guidance application may retrieve chapter descriptions of the e-book version of "Harry Potter and the Sorcerer's Stone" and use these descriptions to generate a second set of metadata that identifies a second sequence of plot segments that collectively represent the story arc of Harry's journey to Hogwarts. For example, the plot segments may be scenes in the e-book that are delineated by changes in location, changes in characters present, changes in character dialogue, etc. In another example, the plot segments may be determined by page number, where, for example, one plot segment could be from page 1 to page 40, the following plot segment could be from page 41 to page 90, etc.

In some embodiments, retrieving the first and second set of metadata may comprise searching within a database of metadata associated with the first and second versions of the media asset to identify a set of metadata having story identifiers that match the unique identifier associated with "Harry Potter and the Sorcerer's Stone." For example, the media guidance application may search within a database of metadata associated with the movie and e-book versions of "Harry Potter and the Sorcerer's Stone" to identify a set of metadata having story identifiers that match the unique identifier of Harry entering the Hogwarts castle. For example, a story identifier may comprise information on characters present, actors portraying the characters, location, dialogue content, and more.

In some embodiments, searching metadata may comprise searching at least one of an online database, a social network, a blog, and subtitles associated with the second media asset for information that describes scenes or chapters in the story, and generating metadata using the description of the scenes and the unique identifier. For example, the media guidance application may search an online database associated with the e-book version of "Harry Potter and the Sorcerer's Stone" for information that describes chapters in the story. The media guidance application may use this information and the unique identifier of the story to generate metadata that identifies a sequence of plot segments that collectively represent the story. For example, the media guidance application may use the information describing chapters in the story and the unique identifier, which is the action of Harry entering the Hogwarts castle, to generate metadata that identifies a sequence of plot segments that collectively represent the story arc of Harry's journey to Hogwarts.

The media guidance application may compare the first sequence of plot segments with the second sequence of plot segments to identify a set of plot segments representing a difference between the first sequence of plot segments and the second sequence of plot segments. For example, the first sequence of plot segments corresponding to the movie version of "Harry Potter and the Sorcerer's Stone" may comprise the plot segments in which Harry arrives at Platform 9¾, Harry meets Ron and Hermione on the Hogwarts Express, and Harry takes a boat across a lake to the Hogwarts castle. For example, the second sequence of plot segments corresponding to the e-book version of "Harry Potter and the Sorcerer's Stone" may comprise the plot segments in which Harry meets Ron, Hermione, and Neville on the Hogwarts Express, Harry buys candy from the lunch trolley on the Hogwarts Express, and Harry takes a boat across a lake to the Hogwarts castle. The media guidance application may compare the first and second sequences and identify a set of plot segments representing the difference between the two sequences, comprising the plot segments in which Harry meets Ron, Hermione, and Neville on the Hogwarts Express and Harry buys candy from the lunch trolley on the Hogwarts Express.

In some embodiments, in response to comparing the first sequence of plot segments with the second sequence of plot segments, the media guidance application may determine that the second sequence of plot segments includes fewer plot segments that the first sequence. For example, the media guidance application may determine that the second sequence of plot segments corresponding to the e-book version of "Harry Potter and the Sorcerer's Stone" includes fewer plot segments than the first sequence of plot segments corresponding to the movie version of the story. The media guidance application may generate the set of plot segments representing the difference between the first and second sequences by selecting the plot segments in the first sequence that are not included in the second sequence. The media guidance application may retrieve metadata associated with the set of plot segments that describes content in the set of plot segments with an indication that the first media asset includes a plot point that is not in the second media asset. For example, the media guidance application may generate the set of plot segments representing the difference between the sequences of plot segments for the movie and e-book versions of "Harry Potter and the Sorcerer's Stone" and retrieve metadata associated with this set of plot segments.

In some embodiments, in response to comparing the first sequence of plot segments with the second sequence of plot segments, the media guidance application may determine that the second sequence of plot segments includes more plot segments than the first sequence. For example, the media guidance application may determine that the second sequence of plot segments corresponding to the e-book version of "Harry Potter and the Sorcerer's Stone" includes more plot segments than the first sequence of plot segments corresponding to the movie version of the story. The media guidance application may generate the set of plot segments representing the difference between the first and second sequences by selecting the plot segments in the second sequence that are not included in the first sequence. The media guidance application may retrieve metadata associated with the set of plot segments that describes content in the set of plot segments with an indication that the second media asset includes a plot point that is not in the first media asset. For example, the media guidance application may generate the set of plot segments representing the difference between the sequences of plot segments for the movie and e-book versions of "Harry Potter and the Sorcerer's Stone" and retrieve metadata associated with this set of plot segments.

In some embodiments, in response to comparing the first sequence of plot segments with the second sequence of plot segments, the media guidance application may identify a first plot segment in the first sequence of plot segments that has a plot descriptor that matches, in part, a second plot segment in the second sequence of plot segments. For example, the media guidance application may identify a first plot segment from the first sequence of plot segments associated with the movie version of "Harry Potter and the Sorcerer's Stone" that has a plot descriptor involving broomsticks and the Gryffindor Quidditch Team. The media guidance application may detect that this plot descriptor matches in part a second plot segment in the second sequence of plot segments associated with the e-book version of "Harry Potter and the Sorcerer's Stone" involving Harry riding a broomstick for the first time.

The media guidance application may retrieve a portion of the plot descriptor that is in the first plot segment and is not in the second plot segment. For example, the media guidance application may retrieve the portion of the plot descriptor involving the Gryffindor Quidditch Team, which is in the first plot segment and is not in the second plot segment. The media guidance application may generate the set of plot segments by selecting the portion of the plot descriptor. For example, the media guidance application may select the portion of the plot descriptor involving the Gryffindor Quidditch Team and generate the set of plot segments representing the difference between the first and second sequences of plot segments.

The media guidance application may determine, while the first media asset is being accessed by the user, whether a given plot segment in the first sequence associated with a current play position corresponds to the first plot segment representing a resolution to the story arc. For example, while the user is watching the movie version of "Harry Potter and the Sorcerer's Stone," the media guidance application may determine whether the plot segment in the first sequence associated with the user's current play position corresponds to the plot segment involving Harry entering the Hogwarts castle, which represents a resolution to the story arc of Harry's journey to Hogwarts.

In response to determining the given plot segment in the first sequence associated with the current play position corresponds to the first plot segment, the media guidance application may detect that the user accessing the first media asset has reached the plot segment that represents the resolution to the story. For example, in response to determining that the given plot segment in the first sequence associated with the current play position of the user watching the movie version of "Harry Potter and the Sorcerer's Stone" corresponds to the first plot segment in which Harry enters the Hogwarts castle, the media guidance application may detect that the user has reached the plot segment that represents the resolution to the story arc of Harry's journey to Hogwarts.

In response to detecting that the user has reached the plot segment that represents the resolution to the story arc, the media guidance application may generate for display a summary of the set of plot segments representing the difference between the first sequence of plot segments and the second sequence of plot segments. For example, upon detecting that the user consuming the movie version of "Harry Potter and the Sorcerer's Stone" has reached the plot segment that represents the resolution to the story, the media guidance application may generate for display a summary of the set of plot segments representing the difference between the first and second sequences, and display this summary on the screen of the device that the user is watching the movie on.

In some embodiments, generating for display the summary may comprise at least one of presenting the set of plot segments to a user and generating a textual representation of the retrieved metadata. For example, the media guidance application may present the set of plot segments representing the difference between the first and second plot sequences to the user by displaying information on the plot segments on the screen of the device that the user is watching the movie on. In another example, the media guidance application may generate a textual summary of the retrieved metadata and display that on the screen of the device that the user is watching the movie on.

In some embodiments, in response to comparing the first sequence of plot segments with the second sequence of plot segments, the media guidance application may access a social network to identify a set of social commentary that relates to the difference between the first sequence of plot segments and the second sequence of plot segments, and add the set of social commentary to the summary. For example, the media guidance application may identify a set of social commentary relating to the differences between the movie and e-book versions of "Harry Potter and the Sorcerer's Stone" on Facebook and add the set of social commentary to the summary generated for display to the user.

In some embodiments, the media guidance application may determine whether the set of plot segments includes content that violates a parental control setting. For example, the media guidance application may determine that the set of plot segments representing the difference between the movie and e-book versions of "Harry Potter and the Sorcerer's Stone" includes a plot segment that violates a parental control setting. In response to determining the set of plot segments includes content that violates a parental control setting, the media guidance application may prevent the summary from being presented. For example, the media guidance application may prevent the summary of differences from being presented to the user and instead display a notification that indicates that the summary is being prevented from being displayed because of content that violates a parental control setting. In another embodiment, the media guidance application may remove plot segments that violate a parental control setting and display the summary with those plot segments omitted.

In some embodiments, the media guidance application may determine a reaction of the user to the summary. For example, the media guidance application may determine that the user reacted to the summary with disappointment over a particular plot segment in the e-book version of "Harry Potter and the Sorcerer's Stone" not being included in the movie version.

The media guidance application may search for another story that includes a similar set of differences in plot sequences as the selected story. For example, if the media guidance application has determined that the movie version of "Harry Potter and the Sorcerer's Stone" has many fewer plot segments than the e-book version, the media guidance application may search a database for another story that has one available version with many fewer plot segments than a second available version. The media guidance application may recommend another media asset representing the other story at a point in time in which a schedule of the user indicates the user has availability to access the other media asset. For example, the media guidance application may identify a media asset to recommend to the user and search for a period of availability in the user's calendar that is long enough to accommodate the user consuming the media asset, during which it will make the recommendation.

In some embodiments, the media guidance application may use the existing versions of the story to retrieve or generate customized content for the user. This content may include alternative plot segments that are based on the user reaction to the summary, user preferences from a user profile, previous user behavior, etc. In one example, the alternative content may be chosen from a set of alternative plot lines created by the creators of the media assets. For example, the media guidance application may retrieve a set of alternative plot lines created by the director of the movie version of "Harry Potter and the Sorcerer's Stone" from an online source. In another example, the alternative content may be generated by the media guidance application using artificial intelligence. The media guidance application may, in the process of retrieving or generating customized content for the user, crowdsource material from a source such as online summaries, blogs, fan fiction, reaction videos, etc. The media guidance application may present this material to the user and allow the user to interact with the material in order to enhance the user experience. For example, the media guidance application may retrieve information on the production and filming of the movie version of "Harry Potter and the Sorcerer's Stone" and present that information to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
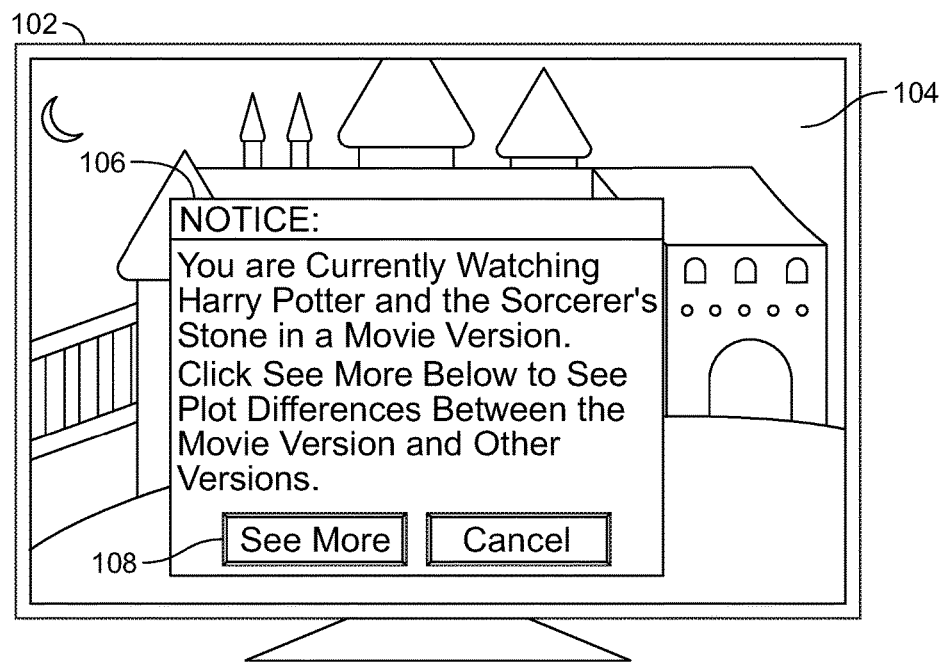
FIG. 1 shows a user device playing back a media asset and displaying a prompt to the user involving differences between media asset versions.

Systems and methods for alerting users to differences between first and second media versions of a story using a media guidance application are provided. For example, the media guidance application may be implemented on user equipment (e.g., a set-top box, a television, an e-reader, a tablet computer, a personal computer, etc.). A user may be interested in consuming the story "Harry Potter and the Sorcerer's Stone," which is available in a movie version and an e-book version. Given a first media asset that is the movie version of the story and a second media asset that is the e-book version of the story, the media guidance application may identify a first sequence of plot segments in the first media asset that collectively represent a story arc. As referred to herein, a "plot segment" means a representation of the occurrence of an event within a plot that spins the plot action around in another direction. As referred to herein, a "story arc" means an extended or continuing storyline in episodic media such as television, comic books, comic strips, board games, video games, films, etc. For example, the media guidance application may identify from the movie version of the story a first sequence of plot segments, including Harry arriving at Platform 9¾, Harry meeting Ron and Hermione on the Hogwarts Express, and Harry taking a boat across a lake to the Hogwarts castle, that collectively represent the story arc of Harry's journey to Hogwarts. The media guidance application may process the second media asset to identify a second sequence of plot segments that collectively represent the story arc. For example, the media guidance application may identify from the e-book version of the story a second sequence of plot segments, including Harry meeting Ron, Hermione, and Neville on the Hogwarts Express, Harry buying candy from the lunch trolley on the Hogwarts Express, and Harry taking a boat across a lake to the Hogwarts castle, that collectively represent the story arc of Harry's journey to Hogwarts. The media guidance application may, for example, store these sequences of plot segments as data structures with information fields that represent plot segment characteristics and identifiers, such as characters present, location, dialogue content, etc.

The media guidance application may compare the first sequence of plot segments with the second sequence of plot segments to identify a set of plot segments that represent a difference between the first and second sequences. While a user is consuming the first media asset, for example by watching the movie version of "Harry Potter and the Sorcerer's Stone," the media guidance application may detect that the user has reached a given plot segment of the first sequence of plot segments that represents a resolution to the story arc. For example, the media guidance application may detect that the user has reached the plot segment of Harry entering the Hogwarts castle, which the media guidance application has identified as the given plot segment that represents a resolution to the story arc of Harry's journey to Hogwarts. The media guidance application may, for example, identify the given plot segment by accessing a database that stores information on plot segments representing the resolution to story arcs for media assets. The media guidance application may retrieve from this database plot segment characteristics that it can use to compare to the current plot segment that the user is viewing in order to identify a match between the current plot segment and the given plot segment representing the resolution to the story arc. In response to detecting that the user has reached the given plot segment, the media guidance application may generate for display a summary of the set of plot segments representing the difference between the first and second sequences of plot segments. The media guidance application may, for example, generate a list of differences between the first and second sequences of plot segments as the user is consuming the media asset. For example, the media guidance application may, upon detecting that the user has reached the end of a plot segment in the first media asset, compare characteristics of this plot segment in the first media asset with an associated plot segment in the second media asset for differences. For example, the media guidance application may identify the associated plot segment in the second media asset by detecting that there is a threshold amount of similarity between the characteristics of the plot segment in the first media asset and the associated plot segment in the second media asset. After comparing plot segment characteristics to detect differences, the media guidance application may add the detected differences to a list that is later processed to generate for display the summary of differences that is shown to the user. This display augments the user's engagement with the story and enhances their overall experience with the media asset.

FIG. 1 shows a user device 102 playing back a media asset 104 and displaying a prompt 106 to the user involving differences between media asset versions. For example, the user device 102 may be a television that is playing back a scene 104 from the movie "Harry Potter and the Sorcerer's Stone." There may be a notification prompt 106 displayed to the user that informs the user that they are currently accessing a media asset that is available in other versions. The notification prompt may have a button 108 that may be selected by the user to request additional information, such as a detailed summary of differences between versions of the media asset.

Figure 2:
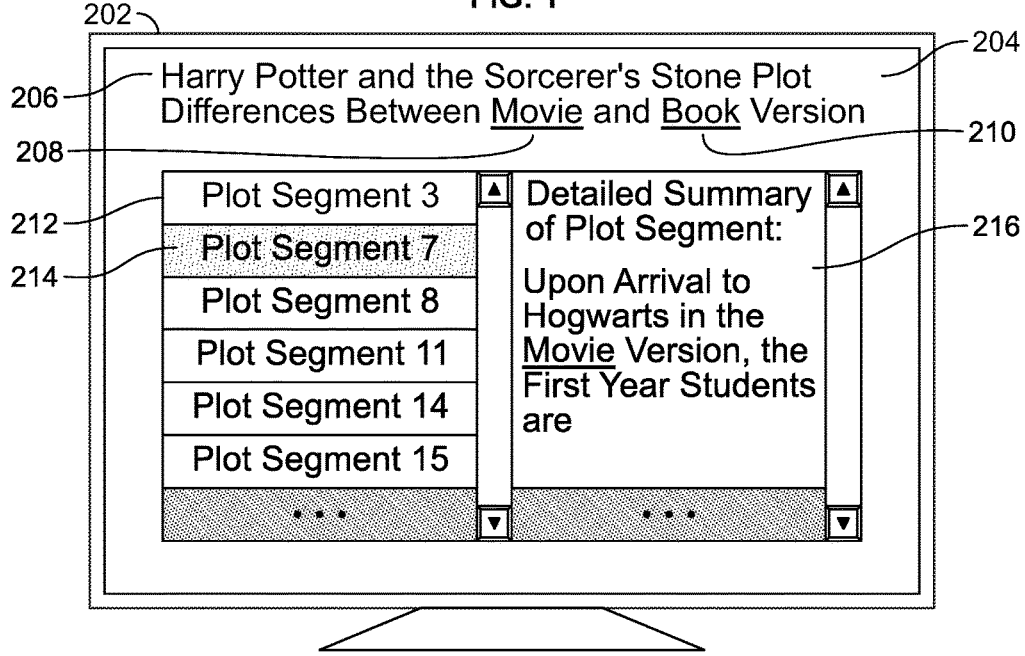
FIG. 2 shows a user device displaying a summary of plot differences between media asset versions.

FIG. 2 shows a user device 202 displaying a summary of plot differences between media asset versions. For example, the user device 202 may be a television with display 204. The display may include the story name 206—for example, "Harry Potter and the Sorcerer's Stone." The display may include labels 208 and 210 that identify the versions of the media assets that are being compared for the summary, such as "movie" and "book." The display may include a scrolling list of plot segments 212, where each plot segment may be selected by the user. A selected plot segment 214 may be indicated as selected by shading or another means. Given a selected plot segment, the display may include a pane 216 that provides a detailed summary of the selected plot segment and associated differences in the plot segments between the two media asset versions.

In some embodiments, the media guidance application may receive a user selection of a media asset. For example, the user may indicate via a user interface a selection of the movie version of "Harry Potter and the Sorcerer's Stone." The user may use a remote control device to interact with the user interface, which may be displayed on the screen of the user device. The user interface may include features that allow the user to search for a specific media asset or explore a selection of media assets. The user may be able to search or explore media assets within a library associated with the user, through an online database, etc.

The media guidance application may determine that the media asset is available in a first version and a second version. For example, the media guidance application may determine that the movie version of "Harry Potter and the Sorcerer's Stone" is available in the movie version as a first version and in an e-book version as a second version. The media guidance application may, for example, determine there are multiple versions of a media asset that are available by accessing a database of available media assets and searching for additional versions of the media asset, querying an online resource for additional versions, searching through a digital library associated with the user for additional versions, or another method.

The media guidance application may retrieve a first set of metadata associated with the first version of the media asset, the first metadata identifying a first sequence of plot segments that collectively represent a story arc in the first version of the media asset. For example, the media guidance application may retrieve subtitles of the movie version of "Harry Potter and the Sorcerer's Stone" and use the subtitles to generate a first set of a metadata identifying a first sequence of plot segments that collectively represent the story arc of Harry's journey to Hogwarts. The media guidance application may use natural language processing, machine learning algorithms, or another means to process the subtitles or other retrieved metadata in order to generate the first set of metadata identifying the first sequence of plot segments. In one example, the plot segments may be scenes in the movie that are delineated by changes in location, changes in characters present, changes in character dialogue, etc. For example, a first plot segment may end and a second plot segment may begin when a change in location of the plot is detected. In another example, the plot segments may be determined by points in time within the runtime of the media asset, in this case the movie "Harry Potter and the Sorcerer's Stone." For example, the story arc of Harry's journey to Hogwarts could comprise one plot segment from time 10:00 to time 14:59 in the movie, another plot segment from time 15:00 to time 19:59 in the movie, etc.

The media guidance application may retrieve a unique identifier associated with the story arc in both the first version and the second version of the media asset. For example, the unique identifier may be the action of Harry entering the Hogwarts castle, which is associated with the story arc of Harry's journey to Hogwarts in both the movie version and the e-book version of the story. The unique identifier may be represented through metadata such as subtitle data, object detection via video processing, data resulting from speech recognition, scene description data, data resulting from natural language processing, data resulting from using machine learning algorithms, etc. For example, the unique identifier of Harry entering the Hogwarts castle in the movie version of "Harry Potter and the Sorcerer's Stone" may be identified via a computer vision technique that processes a video clip and detects whether the unique identifier is present. For example, the unique identifier of Harry entering the Hogwarts castle in the e-book version of "Harry Potter and the Sorcerer's Stone" may be identified through a natural language processing algorithm that processes the text of the e-book.

The media guidance application may determine a first plot segment in the first sequence represents a resolution to the story arc in the first version of the media asset based on detecting the unique identifier. For example, the media guidance application may determine the first plot segment representing a resolution to the story arc of Harry's journey to Hogwarts to comprise the scene in which Harry walks into the Hogwarts castle, based on detecting the unique identifier (the action of Harry entering the castle in the movie). For example, detecting the action of Harry entering the castle in the movie may involve processing subtitle data from the scene using a natural language processing algorithm. In another example, detecting the action may be accomplished using machine vision analysis on the video. In another example, detecting the action may involve processing the audio output of the media asset with speech recognition algorithms.

The media guidance application may retrieve a second set of metadata associated with the second version of the media asset, the second metadata identifying a second sequence of plot segments that collectively represent the story arc in the second version of the media asset. For example, the media guidance application may retrieve chapter descriptions of the e-book version of "Harry Potter and the Sorcerer's Stone" and use these descriptions to generate a second set of metadata that identifies a second sequence of plot segments that collectively represent the story arc of Harry's journey to Hogwarts. For example, the plot segments may be scenes in the e-book that are delineated by changes in location, changes in characters present, changes in character dialogue, etc. For example, a first plot segment may end and a second plot segment may begin when a new character enters the story. In another example, the plot segments may be determined by page number, where, for example, one plot segment could be from page 1 to page 40, the following plot segment could be from page 41 to page 90, etc. In another example, the plot segments may correlate to respective chapters or sections of the text.

In some embodiments, retrieving the first and second set of metadata may comprise searching within a database of metadata associated with the first and second versions of the media asset to identify a set of metadata having story identifiers that match the unique identifier associated with "Harry Potter and the Sorcerer's Stone." For example, the media guidance application may search within a database of metadata associated with the movie and e-book versions of "Harry Potter and the Sorcerer's Stone" to identify a set of metadata having story identifiers that match the unique identifier of Harry entering the Hogwarts castle. For example, a story identifier may comprise information on characters present, actors portraying the characters, location, dialogue content, and more. The story identifiers may be represented as data structures or through another means.

In some embodiments, searching metadata may comprise searching at least one of an online database, a social network, a blog, and subtitles associated with the second media asset for information that describes scenes or chapters in the story, and generating metadata using the scene or chapter descriptions and the unique identifier. For example, the media guidance application may search an online database associated with the e-book version of "Harry Potter and the Sorcerer's Stone" for information that describes chapters in the e-book. The media guidance application may use this information and the unique identifier of the story to generate metadata that identifies a sequence of plot segments that collectively represent the story. For example, given the unique identifier of Harry entering the Hogwarts castle, which is detected in the e-book through natural language processing algorithms and keyword detection and is represented by a data structure, the media guidance application may use the chapter descriptions to generate similarly formatted data structures corresponding to other plot segments.

The media guidance application may compare the first sequence of plot segments with the second sequence of plot segments to identify a set of plot segments representing a difference between the first sequence of plot segments and the second sequence of plot segments. For example, the first sequence of plot segments corresponding to the movie version of "Harry Potter and the Sorcerer's Stone" may comprise the plot segments in which Harry arrives at Platform 9¾, Harry meets Ron and Hermione on the Hogwarts Express, and Harry takes a boat across a lake to the Hogwarts castle. For example, the second sequence of plot segments corresponding to the e-book version of "Harry Potter and the Sorcerer's Stone" may comprise the plot segments in which Harry meets Ron, Hermione, and Neville on the Hogwarts Express, Harry buys candy from the lunch trolley on the Hogwarts Express, and Harry takes a boat across a lake to the Hogwarts castle. The media guidance application may compare the first and second sequences and identify a set of plot segments representing the difference between the two sequences. The media guidance application may conduct this comparison by, for each plot segment in the first sequence of plot segments, searching in the second sequence of plot segments for associated plot segments that correspond in plot segment characteristics and identifiers to the plot segment in the first sequence. In the above example, the set of plot segments representing the difference between the two sequences may comprise the plot segments in which Harry meets Ron, Hermione, and Neville on the Hogwarts Express and Harry buys candy from the lunch trolley on the Hogwarts Express. In this example, the differences detected may include the presence of the character Neville in the first plot segment and the entirety of the second plot segment involving Harry buying candy from the lunch trolley on the Hogwarts Express, if, for example, the second plot segment occurred only in the e-book version but not the movie version.

In some embodiments, in response to comparing the first sequence of plot segments with the second sequence of plot segments, the media guidance application may determine that the second sequence of plot segments includes fewer plot segments than the first sequence. For example, the media guidance application may determine that the second sequence of plot segments corresponding to the e-book version of "Harry Potter and the Sorcerer's Stone" includes fewer plot segments than the first sequence of plot segments corresponding to the movie version of the story. In one example, the plot segments of the e-book may correspond to chapters in the e-book, and the plot segments of the movie may correspond to scenes in the movie. The media guidance application may, in response to comparing the sequences of plot segments, determine that there are fewer plot segments in the second sequence, corresponding to the chapters in the e-book version, than in the first sequence, corresponding to scenes in the movie version. The media guidance application may generate the set of plot segments representing the difference between the first and second sequences by selecting the plot segments in the first sequence that are not included in the second sequence. The media guidance application may retrieve metadata associated with the set of plot segments that describes content in the set of plot segments with an indication that the first media asset includes a plot point that is not in the second media asset. For example, the media guidance application may retrieve plot descriptors from an online database associated with the set of plot segments and, in generating the summary of differences in plot segments for display for the user, list the set of plot segments with an indication that the movie version of the media asset includes plot points that are not in the e-book version of the media asset.

In some embodiments, in response to comparing the first sequence of plot segments with the second sequence of plot segments, the media guidance application may determine that the second sequence of plot segments includes more plot segments than the first sequence. In one example, the plot segments in both sequences corresponding to both the movie and the e-book versions of "Harry Potter and the Sorcerer's Stone" may be delineated by changes in location. The media guidance application may determine that the second sequence of plot segments corresponding to the e-book version of "Harry Potter and the Sorcerer's Stone" includes more plot segments than the first sequence of plot segments corresponding to the movie version of the story. The media guidance application may generate the set of plot segments representing the difference between the first and second sequences by selecting the plot segments in the second sequence that are not included in the first sequence. The media guidance application may retrieve metadata associated with the set of plot segments that describes content in the set of plot segments with an indication that the second media asset includes a plot point that is not in the first media asset. For example, the media guidance application may retrieve plot descriptors from an online database associated with the set of plot segments and, in generating the summary of differences in plot segments for display for the user, list the set of plot segments with an indication that the e-book version of the media asset includes plot points that are not in the movie version of the media asset.

In some embodiments, in response to comparing the first sequence of plot segments with the second sequence of plot segments, the media guidance application may identify a first plot segment in the first sequence of plot segments that has a plot descriptor that matches in part a second plot segment in the second sequence of plot segments. For example, the media guidance application may identify a first plot segment from the first sequence of plot segments associated with the movie version of "Harry Potter and the Sorcerer's Stone" that has a plot descriptor involving broomsticks and the Gryffindor Quidditch Team. The media guidance application may detect that this plot descriptor matches in part a second plot segment in the second sequence of plot segments associated with the e-book version of "Harry Potter and the Sorcerer's Stone" involving Harry riding a broomstick for the first time. The media guidance application may, for example, detect this match by using keyword detection. In another example, the media guidance application may use pre-defined categories representing themes within the plot descriptors to identify similar or related content.

The media guidance application may retrieve a portion of the plot descriptor that is in the first plot segment and is not in the second plot segment. For example, the media guidance application may identify a first plot segment from the first sequence of plot segments associated with the movie version of "Harry Potter and the Sorcerer's Stone" that has a plot descriptor involving broomsticks and the Gryffindor Quidditch Team. The media guidance application may detect that this plot descriptor matches in part a second plot segment in the second sequence of plot segments associated with the e-book version of "Harry Potter and the Sorcerer's Stone" involving Harry riding a broomstick for the first time. The media guidance application may retrieve the portion of the plot descriptor involving the Gryffindor Quidditch Team, which is in the first plot segment and is not in the second plot segment. The media guidance application may generate the set of plot segments by selecting the portion of the plot descriptor. For example, the media guidance application may select the portion of the plot descriptor involving the Gryffindor Quidditch Team and generate the set of plot segments representing the difference between the first and second sequences of plot segments.

The media guidance application may determine, while the first media asset is being accessed by the user, whether a given plot segment in the first sequence associated with a current play position corresponds to the first plot segment representing a resolution to the story arc. For example, while the user is watching the movie version of "Harry Potter and the Sorcerer's Stone," the media guidance application may determine whether the plot segment in the first sequence associated with the user's current play position corresponds to the plot segment involving Harry entering the Hogwarts castle, which represents a resolution to the story arc of Harry's journey to Hogwarts. For example, the media guidance application may determine whether the user has reached the first plot segment representing a resolution to the story arc by determining whether the time marker for the user's current play position of the movie falls within a playback time range associated with the first plot segment. In another example, the media guidance application may use computer vision techniques to detect whether the content that the user is currently accessing in the media asset corresponds to the content in the first plot segment representing the resolution to the story arc.

In response to determining the given plot segment in the first sequence associated with the current play position corresponds to the first plot segment, the media guidance application may detect that the user accessing the first media asset has reached the plot segment that represents the resolution to the story. For example, in response to determining that the given plot segment in the first sequence associated with the current play position of the user watching the movie version of "Harry Potter and the Sorcerer's Stone" corresponds to the first plot segment in which Harry enters the Hogwarts castle, the media guidance application may detect that the user has reached the plot segment that represents the resolution to the story arc of Harry's journey to Hogwarts.

In response to detecting that the user has reached the plot segment that represents the resolution to the story arc, the media guidance application may generate for display a summary of the set of plot segments representing the difference between the first sequence of plot segments and the second sequence of plot segments. For example, the media guidance application may generate and update a list of the set of plot segments representing the difference between the first and second sequences while the user is accessing the first version of the media asset, in this case the movie version of "Harry Potter and the Sorcerer's Stone." Upon detecting that the user consuming the movie version has reached the plot segment that represents the resolution to the story, the media guidance application may generate for display a summary of the list of the set of plot segments representing the difference between the first and second sequences, and display this summary on the screen of the device that the user is watching the movie on. The media guidance application may display the summary through an interactive user interface that allows the user to select options to view more information, read more on each plot segment, access auxiliary content, etc.

In some embodiments, generating for display the summary may comprise at least one of presenting the set of plot segments to a user and generating a textual representation of the retrieved metadata associated with the set of plot segments that describes content in the set of plot segments with an indication that one version of the media asset includes a plot point that is not in the other version of the media asset. For example, the media guidance application may present the set of plot segments representing the difference between the first and second plot sequences to the user by displaying information on the plot segments on the screen of the device that the user is watching the movie on. The media guidance application may present the set of plot segments to the user via an interactive user interface that allows the user to select options to view more information, read more on each plot segment, access auxiliary content, etc. In another example, the media guidance application may generate a textual summary of the retrieved metadata and display that on the screen of the device that the user is watching the movie on. In some embodiments, the media guidance application may generate a "break out" display option that allows the user to access the other versions of the media asset, for example at points and plot segments where there have been determined to be differences between the different versions. For example, the media guidance application may allow the user to navigate from the plot segment of the first version of the media asset to the plot segment of the second version of the media asset to observe the difference between the plot segments.

In some embodiments, in response to comparing the first sequence of plot segments with the second sequence of plot segments, the media guidance application may access a social network to identify a set of social commentary that relates to the difference between the first sequence of plot segments and the second sequence of plot segments, and add the set of social commentary to the summary. For example, the media guidance application may identify a set of social commentary relating to the differences between the movie and e-book versions of "Harry Potter and the Sorcerer's Stone" on Facebook by searching through a number of the most recent public posts that include an identifying keyword, and add the set of social commentary to the summary generated for display to the user. In another example, the media guidance application may identify a set of social commentary relating to the differences between the versions of the media asset by searching through the posts of other users that are associated with the user on a social network. In some embodiments, the media guidance application may identify a set of social commentary and use this to gain insight into differences between the versions of the media asset. For example, the media guidance application may identify a set of commentary from a social network regarding user reactions to the different versions of the media asset, and by comparing these reactions within the set of commentary, further identify and analyze differences between the different versions.

In some embodiments, the media guidance application may determine whether the set of plot segments includes content that violates a parental control setting. For example, the media guidance application may determine that the set of plot segments representing the difference between the movie and e-book versions of "Harry Potter and the Sorcerer's Stone" includes a plot segment that violates a parental control setting. The media guidance application may determine this by detecting through computer vision, natural language processing, or another technique that a plot segment within the set representing the difference between the media asset versions includes content that violates a parental control setting. The parental control setting may be set by the media guidance application or configured by the user. In response to determining the set of plot segments includes content that violates a parental control setting, the media guidance application may prevent the summary from being presented. For example, the media guidance application may prevent the summary of differences from being presented to the user and instead display a notification that indicates that the summary is being prevented from being displayed because of content that violates a parental control setting. In another embodiment, the media guidance application may remove plot segments that violate a parental control setting and display the summary with those plot segments omitted.

In some embodiments, the media guidance application may determine a reaction of the user to the summary. For example, the media guidance application may determine that the user reacted to the summary with disappointment over a particular plot segment in the e-book version of "Harry Potter and the Sorcerer's Stone" not being included in the movie version. The media guidance application may use biometric monitoring data, speech recognition on what the user says, or other means to determine a user reaction. In another example, the media guidance application may use the reaction of the user to the summary to determine how to present the summary to the user in the future, for example by ranking plot segment differences based on the user's reaction.

The media guidance application may search for another story that includes a similar set of differences in plot sequences as the selected story. For example, if the media guidance application has determined that the movie version of "Harry Potter and the Sorcerer's Stone" has many fewer plot segments than the e-book version, the media guidance application may search a database for another story that has one available version with many fewer plot segments than a second available version. The media guidance application may recommend another media asset representing the other story at a point in time in which a schedule of the user indicates the user has availability to access the other media asset. For example, the media guidance application may identify a media asset to recommend to the user and search for a period of availability in the user's calendar that is long enough to accommodate the user consuming the media asset, during which it will make the recommendation. In another embodiment, the media guidance application may make the recommendation to the user earlier than the availability in the user's calendar and allow the user to set a calendar event and reminder for the user to consume the other media asset.

In some embodiments, the media guidance application may use the existing versions of the story to retrieve or generate customized content for the user. This content may include alternative plot segments that are based on the user reaction to the summary, user preferences from a user profile, previous user behavior, etc. In one example, the alternative content may be chosen from a set of alternative plot lines created by the creators of the media assets. For example, the media guidance application may retrieve a set of alternative plot lines created by the director of the movie version of "Harry Potter and the Sorcerer's Stone" from an online source. In another example, the alternative content may be generated by the media guidance application using artificial intelligence. The media guidance application may, in the process of retrieving or generating customized content for the user, crowdsource material from a source such as online summaries, blogs, fan fiction, reaction videos, etc. The media guidance application may present this material to the user and allow the user to interact with the material in order to enhance the user experience. For example, the media guidance application may retrieve information on the production and filming of the movie version of "Harry Potter and the Sorcerer's Stone" and present that information to the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
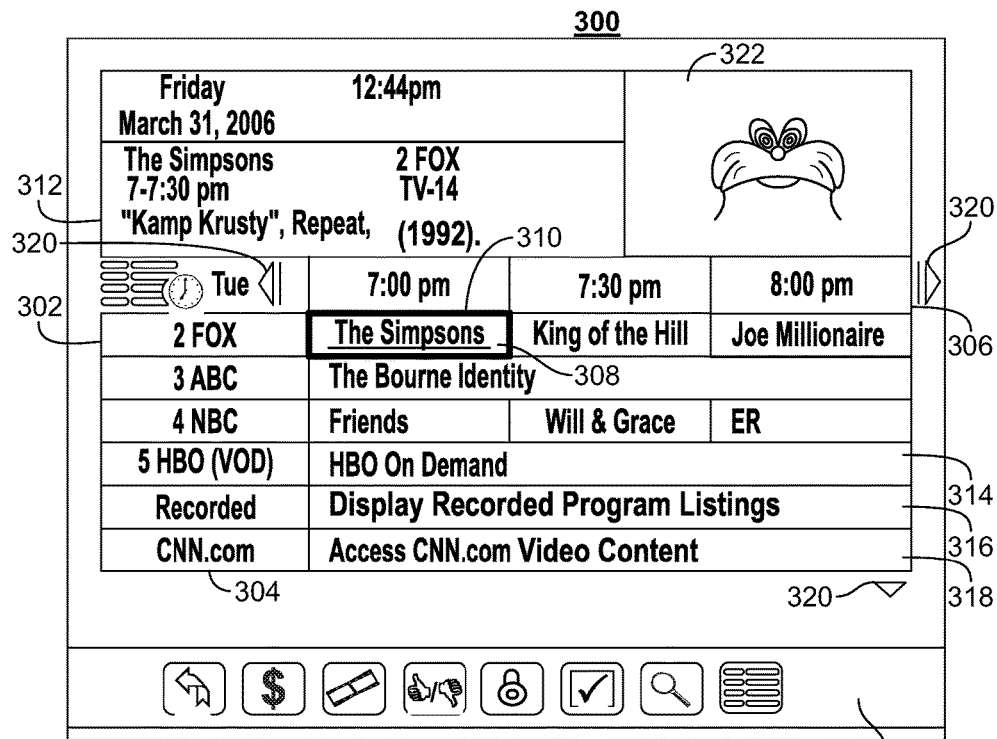
FIGS. 3 and 4 show illustrative examples of display screens generated by a media guidance application in accordance with some embodiments of the disclosure.
Figure 4:
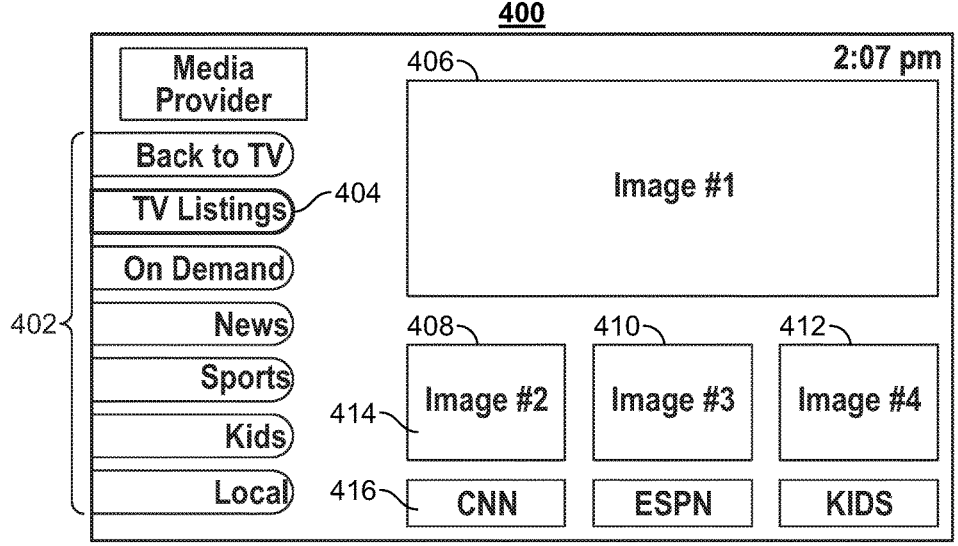

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with:

(1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
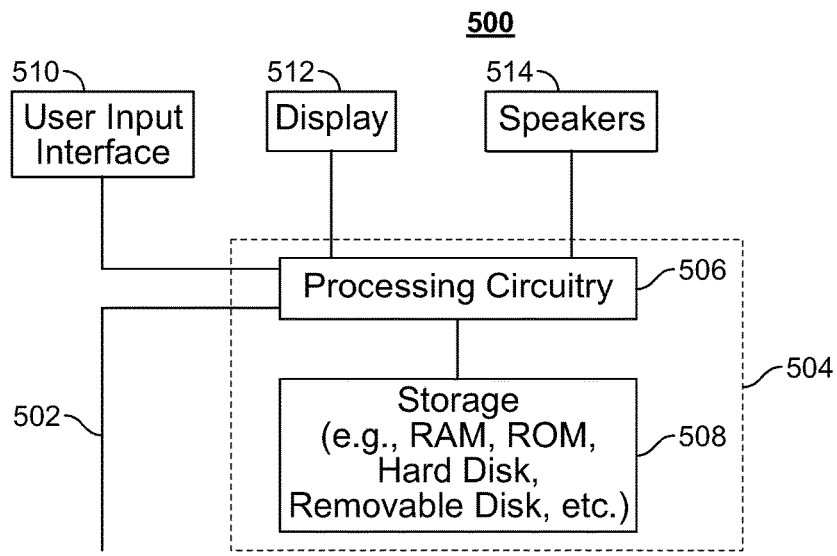
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
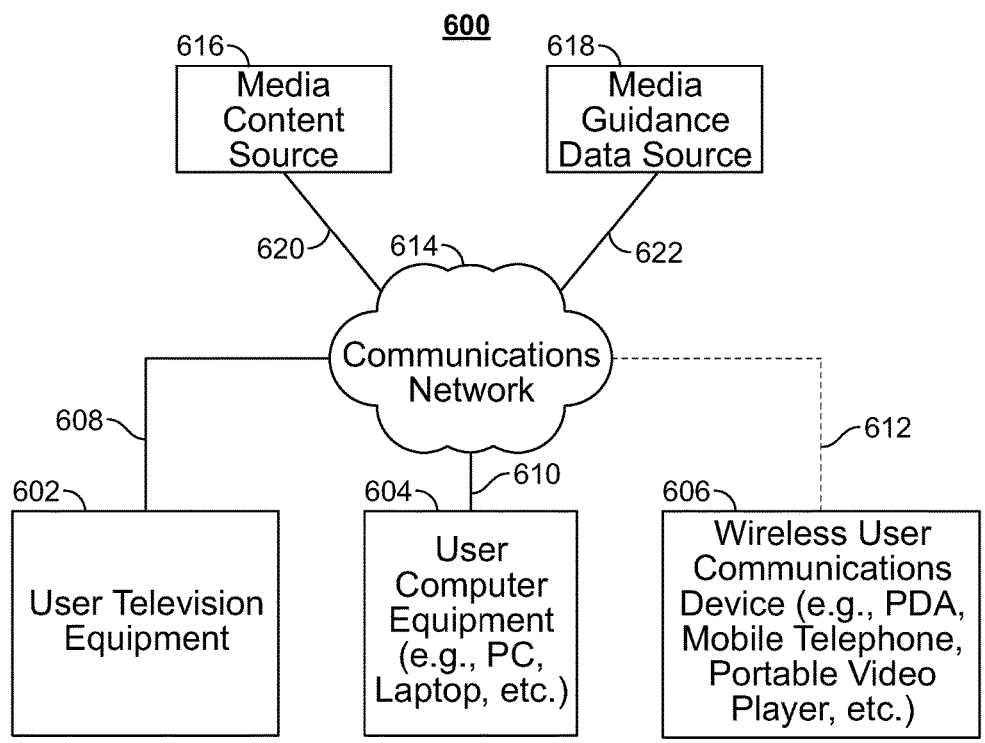
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

System 600 may also include an advertisement source 624 coupled to communications network 614 via a communications path 626. Path 626 may include any of the communications paths described above in connection with paths 608, 610, and 612. Advertisement source 624 may include advertisement logic to determine which advertisements to transmit to specific users and under which circumstances. For example, a cable operator may have the right to insert advertisements during specific time slots on specific channels. Thus, advertisement source 624 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 624 may be configured to maintain user information including advertisement-suitability scores associated with user in order to provide targeted advertising. Additionally or alternatively, a server associated with advertisement source 624 may be configured to store raw information that may be used to derive advertisement-suitability scores. In some embodiments, advertisement source 624 may transmit a request to another device for the raw information and calculate the advertisement-suitability scores. Advertisement source 624 may update advertisement-suitability scores for specific users (e.g., first subset, second subset, or third subset of users) and transmit an advertisement of the target product to appropriate users.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
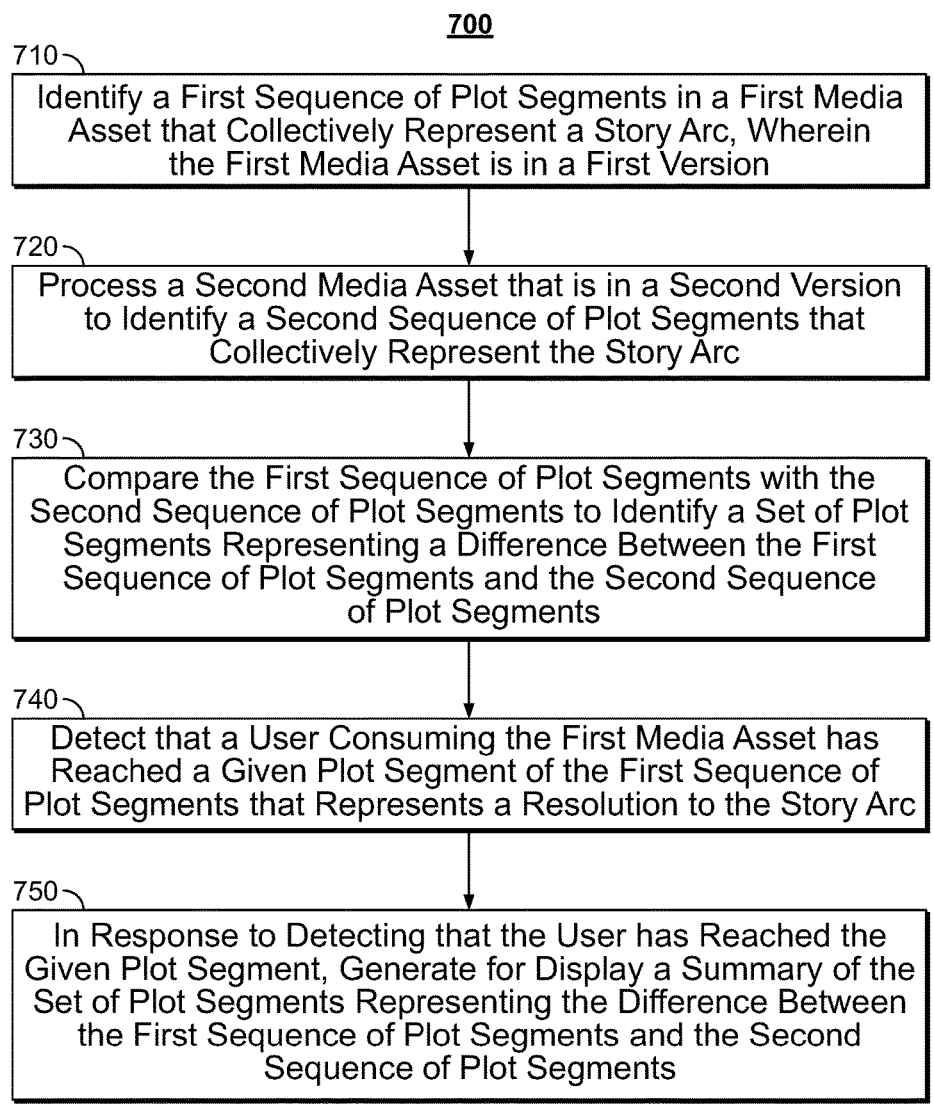
FIG. 7 is a flowchart of a detailed illustrative process for, in response to detecting that the user has reached a given plot segment, generating for display a summary of the set of plot segments representing the difference between the first sequence of plot segments and the second sequence of plot segments in accordance with some embodiments of the disclosure.

FIG. 7 is a flowchart of a detailed illustrative process for, in response to detecting that the user has reached a given plot segment, generating for display a summary of the set of plot segments representing the difference between the first sequence of plot segments and the second sequence of plot segments in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on a user device (e.g., user equipment devices 602, 604, and/or 606 (FIG. 6)) in order to generate the summary for display. In addition, one or more steps of process 700 may be incorporated into or combined with one or more steps of any other process or embodiment described herein.

At step 710, a first sequence of plot segments in a first media asset that collectively represent a story arc is identified, wherein the first media asset is in a first version. For example, the first media asset may be the movie version of "Harry Potter and the Sorcerer's Stone." The media guidance application may identify from the movie version of the story a first sequence of plot segments, including Harry arriving at Platform 9¾, Harry meeting Ron and Hermione on the Hogwarts Express, and Harry taking a boat across a lake to the Hogwarts castle, that collectively represent the story arc of Harry's journey to Hogwarts.

At step 720, a second media asset that is in a second version is processed to identify a second sequence of plot segments that collectively represent the story arc. For example, the second media asset may be the e-book version of "Harry Potter and the Sorcerer's Stone." The media guidance application may identify from the e-book version of the story a second sequence of plot segments, including Harry meeting Ron, Hermione, and Neville on the Hogwarts Express, Harry buying candy from the lunch trolley on the Hogwarts Express, and Harry taking a boat across a lake to the Hogwarts castle, that collectively represent the story arc of Harry's journey to Hogwarts.

At step 730, the first sequence of plot segments is compared with the second sequence of plot segments to identify a set of plot segments representing a difference between the first sequence of plot segments and the second sequence of plot segments. For example, the media guidance application may compare the first sequence of plot segments associated with the movie version of "Harry Potter and the Sorcerer's Stone" and the second sequence of plot segments associated with the e-book version of "Harry Potter and the Sorcerer's Stone." The media guidance application may identify a set of plot segments representing the difference between the two sequences, comprising the plot segments in which Harry meets Ron, Hermione, and Neville on the Hogwarts Express and Harry buys candy from the lunch trolley on the Hogwarts Express.

At step 740, a user consuming the first media asset is detected to have reached a given plot segment of the first sequence of plot segments that represents a resolution to the story arc. For example, the media guidance application may detect that the user watching the movie version of "Harry Potter and the Sorcerer's Stone" has reached the plot segment of Harry entering the Hogwarts castle, which the media guidance application has identified as the given plot segment that represents a resolution to the story arc of Harry's journey to Hogwarts.

At step 750, in response to detecting that the user has reached the given plot segment, a summary of the set of plot segments representing the difference between the first sequence of plot segments and the second sequence of plot segments is generated for display. For example, in response to detecting that the user has reached the given plot segment, the media guidance application may generate for display a summary of the set of plot segments representing the difference between the first and second sequences and display this summary on the screen of the user device on which the user is watching the movie version of "Harry Potter and the Sorcerer's Stone."

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 7.

Figure 8:
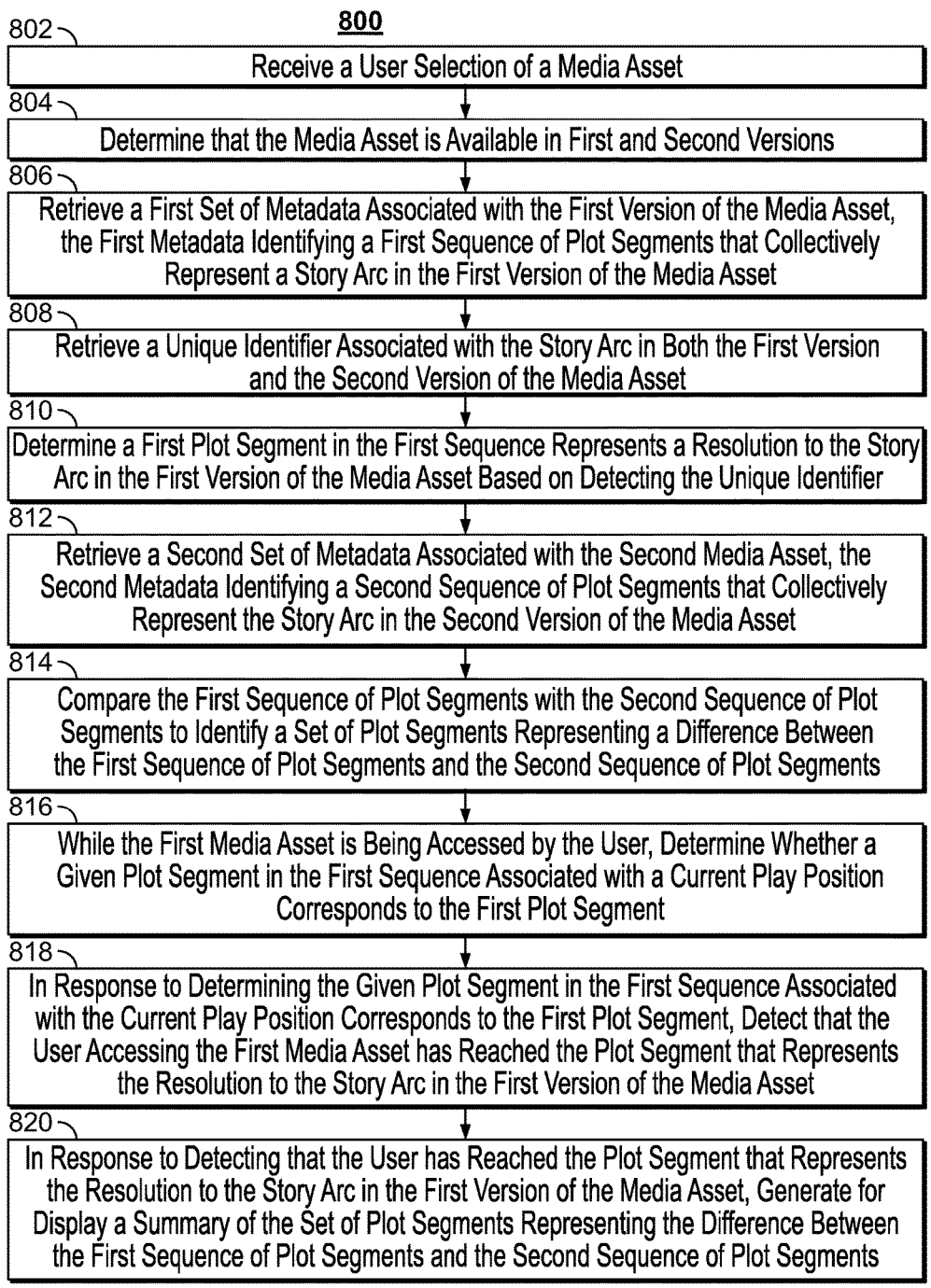
FIG. 8 is a flowchart of a detailed illustrative process for, in response to detecting that the user has reached the plot segment that represents the resolution to the story, generating for display a summary of the set of plot segments representing the difference between the first sequence of plot segments and the second sequence of plot segments in accordance with some embodiments of the disclosure.

FIG. 8 is a flowchart of a detailed illustrative process for, in response to detecting that the user has reached the plot segment that represents the resolution to the story, generating for display a summary of the set of plot segments representing the difference between the first sequence of plot segments and the second sequence of plot segments in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on a user device (e.g., user equipment devices 602, 604, and/or 606 (FIG. 6)) in order to generate the summary for display. In addition, one or more steps of process 800 may be incorporated into or combined with one or more steps of any other process or embodiment described herein.

At step 802, a user selection of a media asset is received. For example, the user may indicate via a user interface a selection of the movie version of "Harry Potter and the Sorcerer's Stone."

At step 804, the media asset is determined to be available in first and second versions. For example, the media guidance application may determine that the movie version of "Harry Potter and the Sorcerer's Stone" is available in the movie version as a first version and in an e-book version as a second version. The media guidance application may, for example, determine there are multiple versions of a media asset that are available by accessing a database of available media assets and searching for additional versions of the media asset, querying an online resource for additional versions, searching through a digital library associated with the user for additional versions, or another method.

At step 806, a first set of metadata associated with the first version of the media asset is retrieved, the first metadata identifying a first sequence of plot segments that collectively represent a story arc in the first version of the media asset. For example, the media guidance application may retrieve subtitles of the movie version of "Harry Potter and the Sorcerer's Stone" and use the subtitles to generate a first set of metadata identifying a first sequence of plot segments that collectively represent the story arc of Harry's journey to Hogwarts. The media guidance application may use natural language processing, machine learning algorithms, or another means to process the subtitles or other retrieved metadata in order to generate the first set of metadata identifying the first sequence of plot segments.

At step 808, a unique identifier associated with the story arc in both the first version and the second version of the media asset is retrieved. For example, the unique identifier may be the action of Harry entering the Hogwarts castle, which is associated with the story arc of Harry's journey to Hogwarts in both the movie version and the e-book version of the story. The unique identifier may be represented through metadata such as subtitle data, object detection via video processing, data resulting from speech recognition, scene description data, data resulting from natural language processing, data resulting from using machine learning algorithms, etc. For example, the unique identifier of Harry entering the Hogwarts castle in the movie version of "Harry Potter and the Sorcerer's Stone" may be identified via a computer vision technique that processes a video clip and detects whether the unique identifier is present. For example, the unique identifier of Harry entering the Hogwarts castle in the e-book version of "Harry Potter and the Sorcerer's Stone" may be identified through a natural language processing algorithm that processes the text of the e-book.

At step 810, a first plot segment in the first sequence is determined to represent a resolution to the story arc in the first version of the media asset based on detecting the unique identifier. For example, the media guidance application may determine the first plot segment representing a resolution to the story arc of Harry's journey to Hogwarts to be the scene in which Harry walks into the Hogwarts castle, based on detecting the unique identifier (the action of Harry entering the castle in the movie). For example, detecting the action of Harry entering the castle in the movie may involve processing subtitle data from the scene using a natural language processing algorithm. In another example, detecting the action may be accomplished using machine vision analysis on the video. In another example, detecting the action may involve processing the audio output of the media asset with speech recognition algorithms.

At step 812, a second set of metadata associated with the second media asset is retrieved, the second metadata identifying a second sequence of plot segments that collectively represent the story arc in the second version of the media asset. For example, the media guidance application may retrieve chapter descriptions of the e-book version of "Harry Potter and the Sorcerer's Stone" and use these descriptions to generate a second set of metadata that identifies a second sequence of plot segments that collectively represent the story arc of Harry's journey to Hogwarts.

At step 814, the first sequence of plot segments is compared with the second sequence of plot segments to identify a set of plot segments representing a difference between the first sequence of plot segments and the second sequence of plot segments. For example, the first sequence of plot segments corresponding to the movie version of "Harry Potter and the Sorcerer's Stone" may comprise the plot segments in which Harry arrives at Platform 9¾, Harry meets Ron and Hermione on the Hogwarts Express, and Harry takes a boat across a lake to the Hogwarts castle. For example, the second sequence of plot segments corresponding to the e-book version of "Harry Potter and the Sorcerer's Stone" may comprise the plot segments in which Harry meets Ron, Hermione, and Neville on the Hogwarts Express, Harry buys candy from the lunch trolley on the Hogwarts Express, and Harry takes a boat across a lake to the Hogwarts castle. The media guidance application may compare the first and second sequences and identify a set of plot segments representing the difference between the two sequences. The media guidance application may conduct this comparison by, for each plot segment in the first sequence of plot segments, searching in the second sequence of plot segments for associated plot segments that correspond in plot segment characteristics and identifiers to the plot segment in the first sequence. In the above example, the set of plot segments representing the difference between the two sequences may comprise the plot segments in which Harry meets Ron, Hermione, and Neville on the Hogwarts Express and Harry buys candy from the lunch trolley on the Hogwarts Express. In this example, the differences detected may include the presence of the character Neville in the first plot segment and the entirety of the second plot segment involving Harry buying candy from the lunch trolley on the Hogwarts Express, if, for example, the second plot segment occurred only in the e-book version but not the movie version.

At step 816, while the first media asset is being accessed by the user, a determination is made as to whether a given plot segment in the first sequence associated with a current play position corresponds to the first plot segment. For example, while the user is watching the movie version of "Harry Potter and the Sorcerer's Stone," the media guidance application may determine whether the plot segment in the first sequence associated with the user's current play position corresponds to the plot segment involving Harry entering the Hogwarts castle, which represents a resolution to the story arc of Harry's journey to Hogwarts. For example, the media guidance application may determine whether the user has reached the first plot segment representing a resolution to the story arc by determining whether the time marker for the user's current play position of the movie falls within a playback time range associated with the first plot segment. In another example, the media guidance application may use computer vision techniques to detect whether the content that the user is currently accessing in the media asset corresponds to the content in the first plot segment representing the resolution to the story arc.

At step 818, in response to determining the given plot segment in the first sequence associated with the current play position corresponds to the first plot segment, the user accessing the first media asset is detected to have reached the plot segment that represents the resolution to the story arc in the first version of the media asset. For example, in response to determining that the given plot segment in the first sequence associated with the current play position of the user watching the movie version of "Harry Potter and the Sorcerer's Stone" corresponds to the first plot segment in which Harry enters the Hogwarts castle, the media guidance application may detect that the user has reached the plot segment that represents the resolution to the story arc of Harry's journey to Hogwarts.

At step 820, in response to detecting that the user has reached the plot segment that represents the resolution to the story arc in the first version of the media asset, a summary of the set of plot segments representing the difference between the first sequence of plot segments and the second sequence of plot segments is generated for display. For example, the media guidance application may generate and update a list of the set of plot segments representing the difference between the first and second sequences while the user is accessing the first version of the media asset, in this case the movie version of "Harry Potter and the Sorcerer's Stone." Upon detecting that the user consuming the movie version has reached the plot segment that represents the resolution to the story, the media guidance application may generate for display a summary of the set of plot segments representing the difference between the first and second sequences, and display this summary on the screen of the device that the user is watching the movie on. The media guidance application may display the summary through an interactive user interface that allows the user to select options to view more information, read more on each plot segment, access auxiliary content, etc.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 8.

Figure 9:
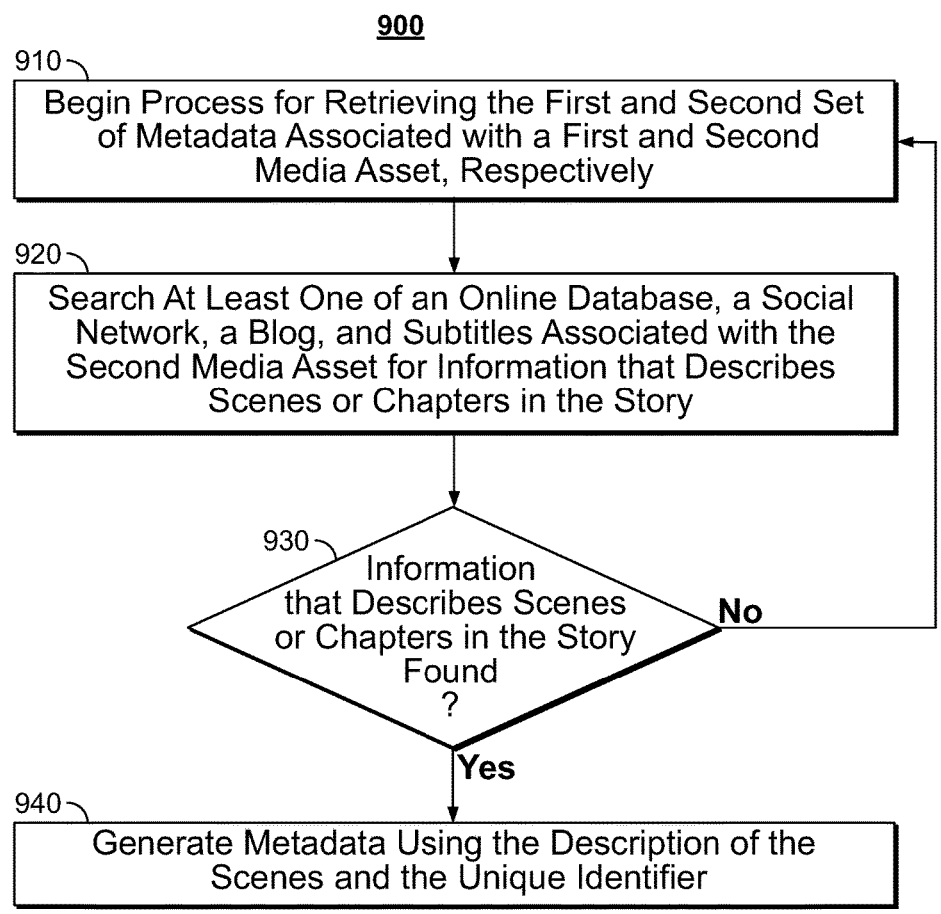
FIG. 9 is a flowchart of a detailed illustrative process for retrieving the first and second set of metadata associated with a first and second media asset, respectively, in accordance with some embodiments of the disclosure.

FIG. 9 is a flowchart of a detailed illustrative process for retrieving the first and second set of metadata associated with a first and second media asset, respectively, in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on a user device (e.g., user equipment devices 602, 604, and/or 606 (FIG. 6)) in order to retrieve the first and second set of metadata. In addition, one or more steps of process 900 may be incorporated into or combined with one or more steps of any other process or embodiment described herein.

At step 910, the process for retrieving the first and second set of metadata associated with a first and second media asset, respectively, is begun. For example, the first media asset may be the movie version of "Harry Potter and the Sorcerer's Stone," and the second media asset may be the e-book version of "Harry Potter and the Sorcerer's Stone."

At step 920, at least one of an online database, a social network, a blog, and subtitles associated with the second media asset are searched for information that describes scenes or chapters in the story. For example, the media guidance application may search an online database associated with the e-book version of "Harry Potter and the Sorcerer's Stone" for information that describes chapters in the e-book.

At step 930, a determination is made as to whether information that describes scenes or chapters in the story has been found. In response to determining that information that describes scenes or chapters in the story has been found, the process proceeds to step 940. Otherwise, the process proceeds to step 910. For example, the media guidance application may determine from its search of the online database associated with the e-book version of "Harry Potter and the Sorcerer's Stone" that it has found information that describes scenes or chapters in the story.

At step 940, metadata is generated using the description of the scenes or chapters and the unique identifier. For example, given the unique identifier of Harry entering the Hogwarts castle, which is detected in the e-book through natural language processing algorithms and the detection of keywords and represented by a data structure, the media guidance application may use the chapter descriptions found in its search to generate similarly formatted data structures corresponding to other plot segments.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 9.

Figure 10:
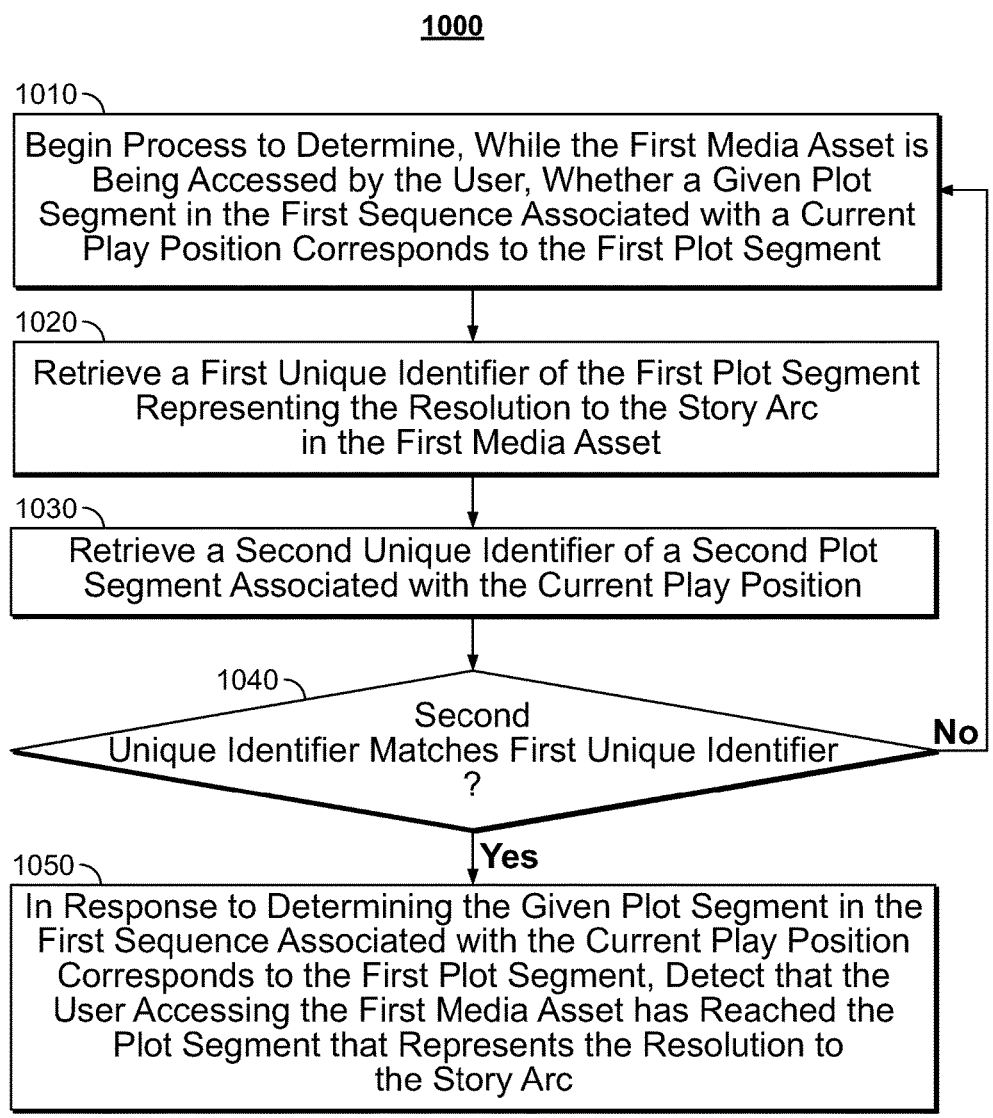
FIG. 10 is a flowchart of a detailed illustrative process for determining, while the first media asset is being accessed by the user, whether a given plot segment in the first sequence associated with a current play position corresponds to the first plot segment representing the resolution to the story arc in accordance with some embodiments of the disclosure.

FIG. 10 is a flowchart of a detailed illustrative process for determining, while the first media asset is being accessed by the user, whether a given plot segment in the first sequence associated with a current play position corresponds to the first plot segment representing the resolution to the story arc in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on a user device (e.g., user equipment devices 602, 604, and/or 606 (FIG. 6)) in order to determine whether the given plot segment associated with a current play position corresponds to the first plot segment. In addition, one or more steps of process 1000 may be incorporated into or combined with one or more steps of any other process or embodiment described herein.

At step 1010, the process is begun to determine, while the first media asset is being accessed by the user, whether a given plot segment in the first sequence associated with a current play position corresponds to the first plot segment. For example, the first media asset may be the movie version of "Harry Potter and the Sorcerer's Stone," which the user is accessing on their television.

At step 1020, a first unique identifier of the first plot segment representing the resolution to the story arc in the first media asset is retrieved. For example, the unique identifier may be the action of Harry entering the Hogwarts castle, which is associated with the resolution of the story arc of Harry's journey to Hogwarts in the movie version of "Harry Potter and the Sorcerer's Stone." The unique identifier may be represented through metadata such as subtitle data, object detection via video processing, data resulting from speech recognition, scene description data, data resulting from natural language processing, data resulting from using machine learning algorithms, etc. For example, the media guidance application may retrieve the unique identifier from a database comprising data on unique identifiers of plot segments, or it may generate the unique identifier itself.

At step 1030, a second unique identifier of a second plot segment associated with the current play position is retrieved. For example, the second unique identifier associated with the current play position may be the action of Harry taking a boat across a lake to the Hogwarts castle. For example, the media guidance application may retrieve the unique identifier from a database comprising data on unique identifiers of plot segments, or it may generate the unique identifier itself by a computer vision technique, a speech recognition technique, a natural language processing technique, etc.

At step 1040, a determination is made as to whether the second unique identifier matches the first unique identifier. In response to determining that the second unique identifier matches the first unique identifier, the process proceeds to step 1050. Otherwise, the process proceeds to step 1010. For example, the media guidance application may determine that the second unique identifier, the action of Harry taking a boat across a lake to the Hogwarts castle, does not match the first unique identifier, the action of Harry entering the Hogwarts castle.

At step 1050, in response to determining the given plot segment in the first sequence associated with the current play position corresponds to the first plot segment, the user accessing the first media asset is detected to have reached the plot segment that represents the resolution to the story arc. For example, if the media guidance application determines that the given plot segment in the first sequence associated with the current play position corresponds to the first plot segment by detecting a match in the first and second unique identifiers comprising the action of Harry entering the Hogwarts castle, the media guidance application may detect that the user watching the movie version of "Harry Potter and the Sorcerer's Stone" has reached the plot segment that represents the resolution to the story arc of Harry's journey to Hogwarts.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 10.

Figure 11:
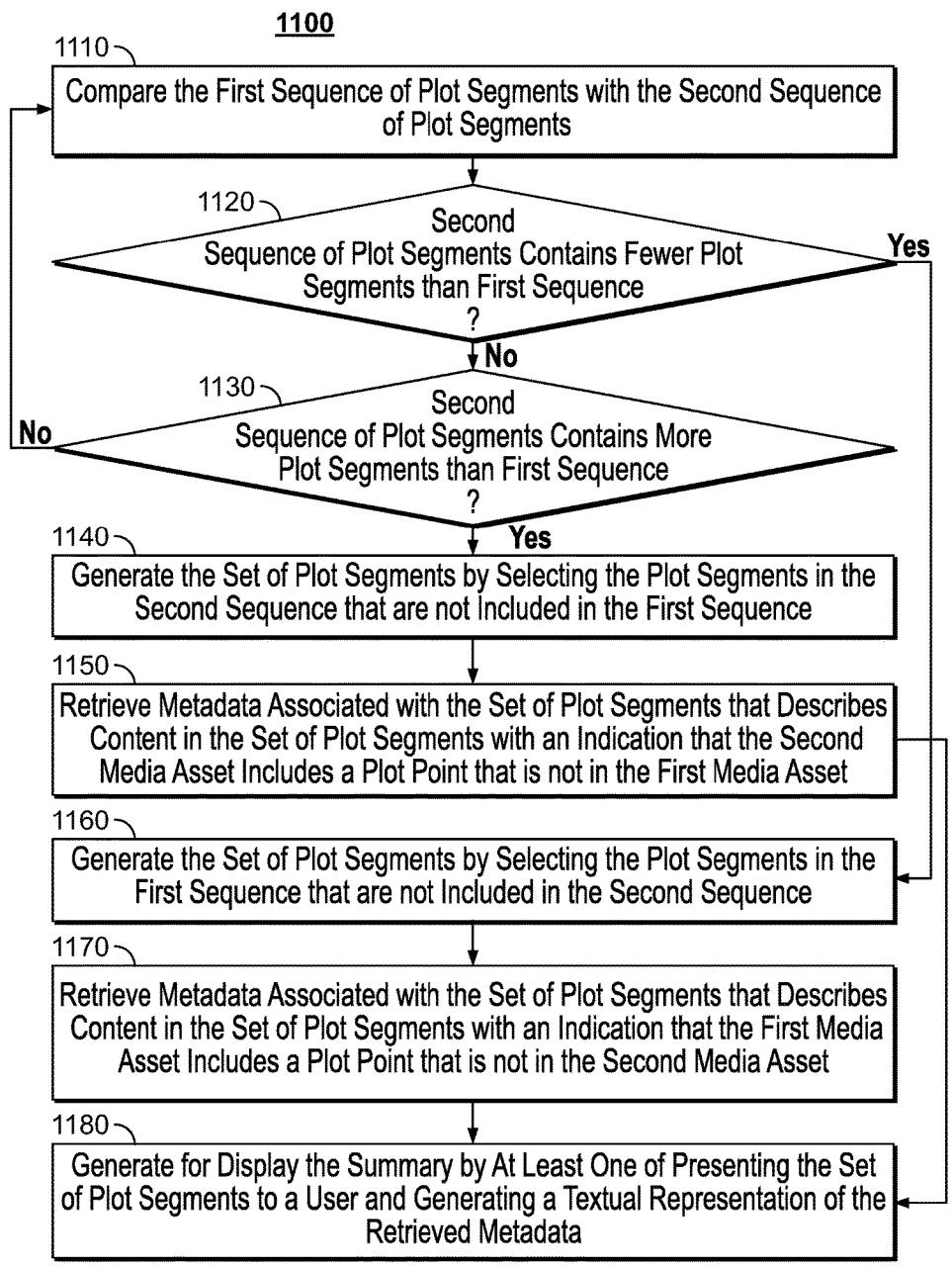
FIG. 11 is a flowchart of a detailed illustrative process for comparing the first sequence of plot segments with the second sequence of plot segments and generating for display the summary in accordance with some embodiments of the disclosure.

FIG. 11 is a flowchart of a detailed illustrative process for comparing the first sequence of plot segments with the second sequence of plot segments and generating for display the summary in accordance with some embodiments of the disclosure. It should be noted that process 1100 or any step thereof could be performed on, or provided by, any of the devices shown in FIGS. 5-6. For example, process 1100 may be executed by control circuitry 504 (FIG. 5) as instructed by a media guidance application implemented on a user device (e.g., user equipment devices 602, 604, and/or 606 (FIG. 6)) in order to compare the sequences of plot segments and generate the summary for display. In addition, one or more steps of process 1100 may be incorporated into or combined with one or more steps of any other process or embodiment described herein.

At step 1110, the first sequence of plot segments is compared with the second sequence of plot segments. For example, the first sequence of plot segments may correspond with the movie version of "Harry Potter and the Sorcerer's Stone" and the second sequence of plot segments may correspond with the e-book version.

At step 1120, a determination is made as to whether the second sequence of plot segments contains fewer plot segments than the first sequence. In response to determining that the second sequence of plot segments contains fewer plot segments than the first sequence, the process proceeds to step 1160. Otherwise, the process proceeds to step 1130. For example, the first sequence of plot segments of the movie may correspond to scenes in the movie, and the second sequence of plot segments of the e-book may correspond to chapters in the e-book. The media guidance application may, in response to comparing the sequences of plot segments, determine that there are fewer plot segments in the second sequence, corresponding to the chapters in the e-book version, than in the first sequence, corresponding to scenes in the movie version.

At step 1130, a determination is made as to whether the second sequence of plot segments contains more plot segments than the first sequence. In response to determining that the second sequence of plot segments contains more plot segments than the first sequence, the process proceeds to step 1140. Otherwise, the process proceeds to step 1100. For example, the plot segments in both sequences corresponding to both the movie and the e-book versions of "Harry Potter and the Sorcerer's Stone" may be delineated by changes in location. The media guidance application may determine that the second sequence of plot segments corresponding to the e-book version of "Harry Potter and the Sorcerer's Stone" includes more plot segments than the first sequence of plot segments corresponding to the movie version of the story.

At step 1140, the set of plot segments is generated by selecting the plot segments in the second sequence that are not included in the first sequence. For example, the media guidance application may generate the set of plot segments representing the difference between the two sequences by selecting the plot segments in the second sequence that are not included in the first sequence, wherein the plot segments in both sequences corresponding to both the movie and the e-book versions of "Harry Potter and the Sorcerer's Stone" may be delineated by changes in location.

At step 1150, metadata associated with the set of plot segments that describes content in the set of plot segments with an indication that the second media asset includes a plot point that is not in the first media asset is retrieved. For example, the media guidance application may retrieve plot descriptors from an online database associated with the set of plot segments and, in generating the summary of differences in plot segments for display for the user, list the set of plot segments with an indication that the e-book version of the media asset includes plot points that are not in the movie version of the media asset.

At step 1160, the set of plot segments is generated by selecting the plot segments in the first sequence that are not included in the second sequence. For example, the media guidance application may generate the set of plot segments representing the difference between the two sequences by selecting the plot segments in the first sequence that are not included in the second sequence, wherein the first sequence corresponds to scenes in the movie version and the second sequence corresponds to chapters in the e-book version of "Harry Potter and the Sorcerer's Stone."

At step 1170, metadata associated with the set of plot segments that describes content in the set of plot segments with an indication that the first media asset includes a plot point that is not in the second media asset is retrieved. For example, the media guidance application may retrieve plot descriptors from an online database associated with the set of plot segments and, in generating the summary of differences in plot segments for display for the user, list the set of plot segments with an indication that the movie version of the media asset includes plot points that are not in the e-book version of the media asset.

At step 1180, the summary is generated for display by at least one of presenting the set of plot segments to a user and generating a textual representation of the retrieved metadata. For example, the media guidance application may present the set of plot segments representing the difference between the first and second plot sequences to the user by displaying information on the plot segments on the screen of the device that the user is watching the movie on. The media guidance application may present the set of plot segments to the user via an interactive user interface that allows the user to select options to view more information, read more on each plot segment, access auxiliary content, etc. In another example, the media guidance application may generate a textual summary of the retrieved metadata and display that on the screen of the device that the user is watching the movie on.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 11.

Figure 12:
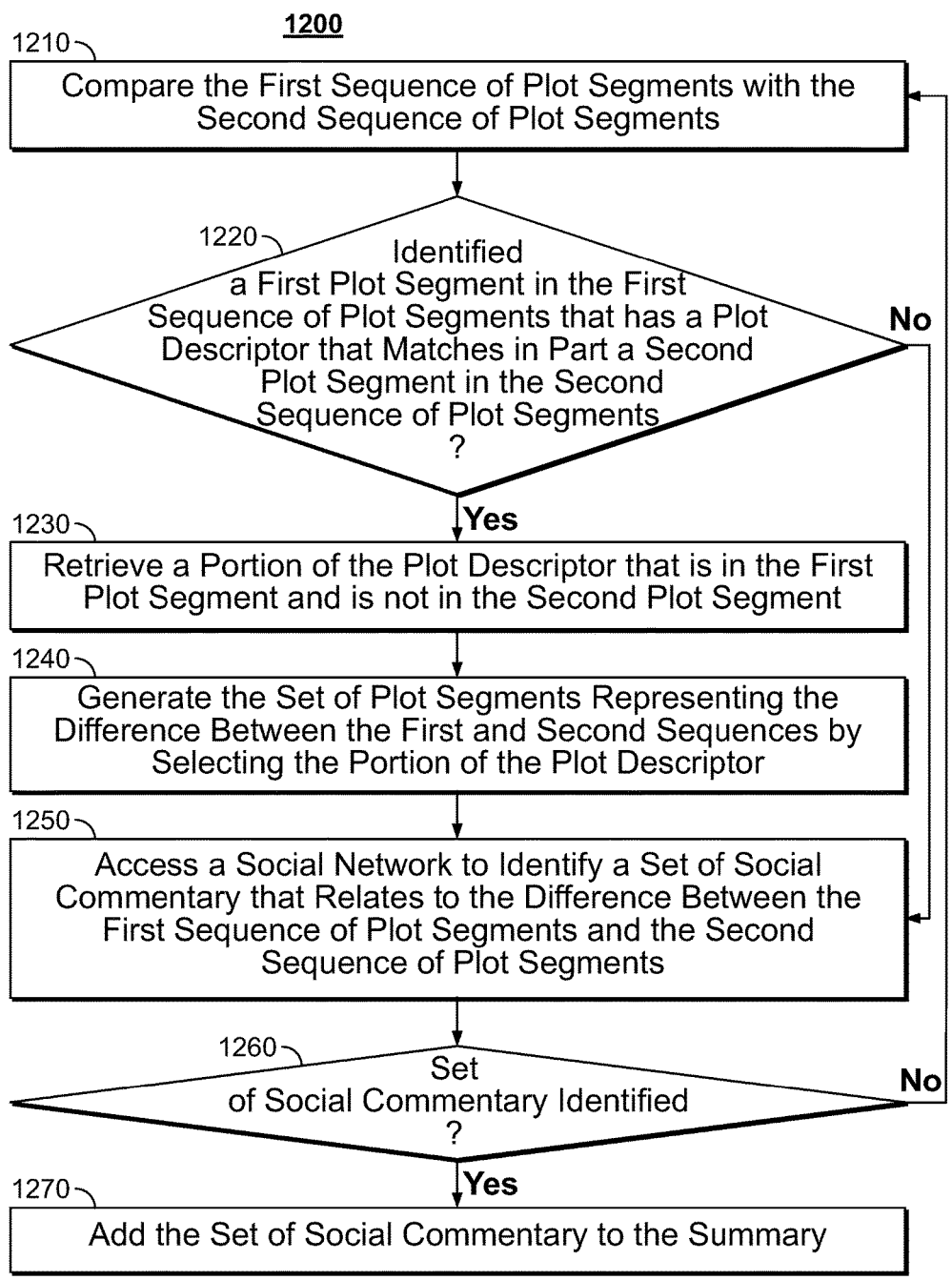
FIG. 12 is a flowchart of a detailed illustrative process for comparing the first sequence of plot segments with the second sequence of plot segments and accessing a social network to identify a set of social commentary that relates to the difference between the first sequence and the second sequence in accordance with some embodiments of the disclosure.

FIG. 12 is a flowchart of a detailed illustrative process for comparing the first sequence of plot segments with the second sequence of plot segments and accessing a social network to identify a set of social commentary that relates to the difference between the first sequence and the second sequence in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on a user device (e.g., user equipment devices 602, 604, and/or 606 (FIG. 6)) in order to compare the sequences of plot segments and access a social network to identify a set of social commentary. In addition, one or more steps of process 1200 may be incorporated into or combined with one or more steps of any other process or embodiment described herein.

At step 1210, the first sequence of plot segments is compared with the second sequence of plot segments. For example, the first sequence of plot segments may correspond with the movie version of "Harry Potter and the Sorcerer's Stone" and the second sequence of plot segments may correspond with the e-book version. The media guidance application may, for each plot segment in the first sequence, compare the plot segment with each plot segment in the second sequence, and generate a list of detected differences between the plot segments.

At step 1220, a determination is made as to whether a first plot segment in the first sequence of plot segments that has a plot descriptor that matches in part a second plot segment in the second sequence of plot segments has been identified. In response to determining that a first plot segment in the first sequence matches in part a second plot segment in the second sequence, the process proceeds to step 1230. Otherwise, the process proceeds to step 1250. For example, the media guidance application may identify a first plot segment from the first sequence of plot segments associated with the movie version of "Harry Potter and the Sorcerer's Stone" that has a plot descriptor involving broomsticks and the Gryffindor Quidditch Team. The media guidance application may detect that this plot descriptor matches in part a second plot segment in the second sequence of plot segments associated with the e-book version of "Harry Potter and the Sorcerer's Stone" involving Harry riding a broomstick for the first time.

At step 1230, a portion of the plot descriptor that is in the first plot segment and is not in the second plot segment is retrieved. For example, the media guidance application may identify a first plot segment from the first sequence of plot segments associated with the movie version of "Harry Potter and the Sorcerer's Stone" that has a plot descriptor involving broomsticks and the Gryffindor Quidditch Team. The media guidance application may detect that this plot descriptor matches in part a second plot segment in the second sequence of plot segments associated with the e-book version of "Harry Potter and the Sorcerer's Stone" involving Harry riding a broomstick for the first time. The media guidance application may retrieve the portion of the plot descriptor involving the Gryffindor Quidditch Team, which is in the first plot segment and is not in the second plot segment.

At step 1240, the set of plot segments representing the difference between the first and second sequences is generated by selecting the portion of the plot descriptor. For example, the media guidance application may select the portion of the plot descriptor involving the Gryffindor Quidditch Team and generate the set of plot segments representing the difference between the first and second sequences of plot segments.

At step 1250, a social network is accessed to identify a set of social commentary that relates to the difference between the first sequence of plot segments and the second sequence of plot segments. For example, the media guidance application may identify a set of social commentary relating to the differences between the movie and e-book versions of "Harry Potter and the Sorcerer's Stone" on Facebook by searching through a number of the most recent posts that include an identifying keyword.

At step 1260, a determination is made as to whether a set of social commentary has been identified. In response to determining that a set of social commentary has been identified, the process proceeds to step 1270. Otherwise, the process proceeds to step 1210. For example, the media guidance application may determine a social commentary that relates to the difference between the first sequence of plot segments corresponding to the movie version and the second sequence of plot segments corresponding to the e-book version has been identified.

At step 1270, the set of social commentary is added to the summary. For example, the media guidance application may add the set of social commentary to the summary and add a pane enclosing the commentary for the display of the summary.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 12.

Figure 13:
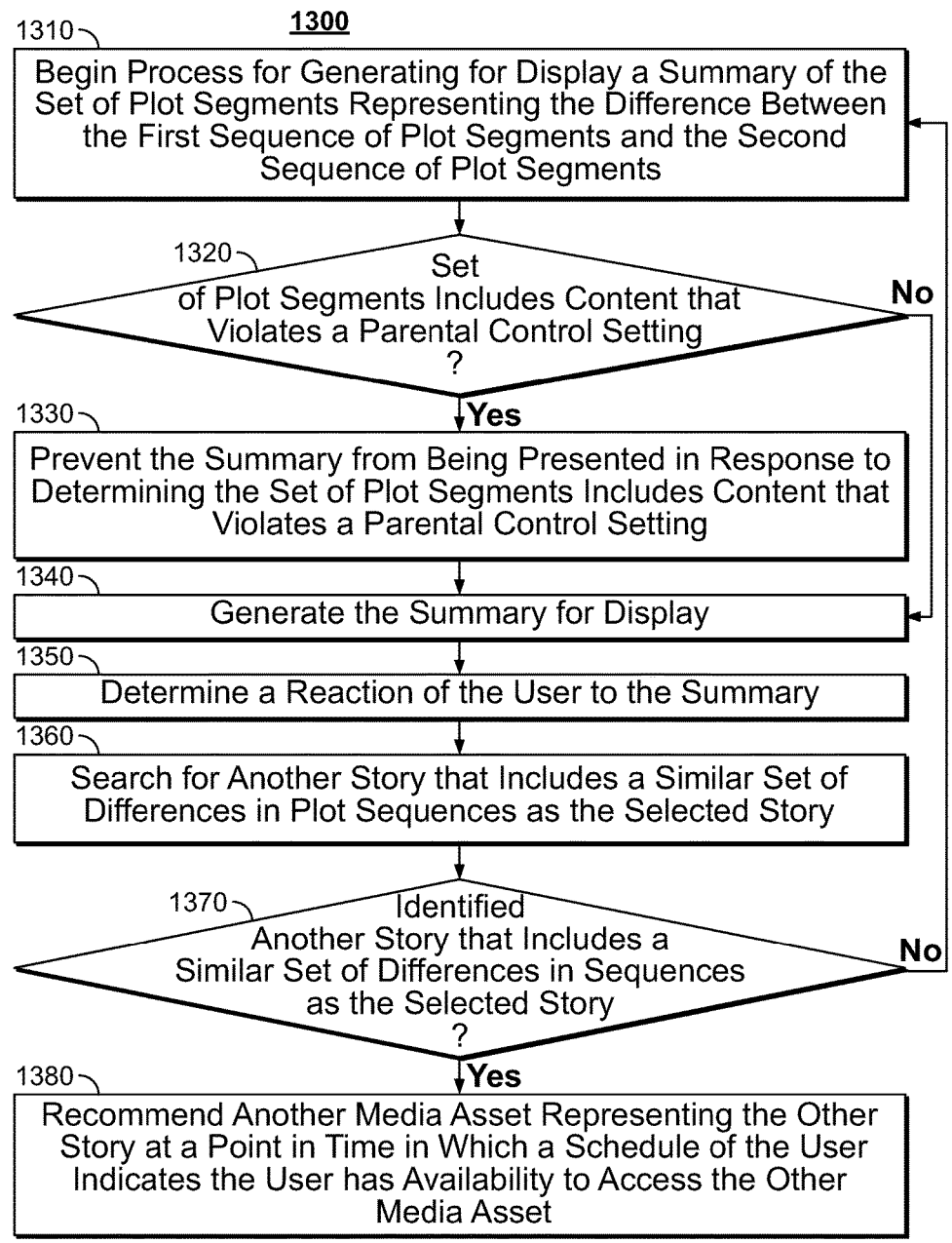
FIG. 13 is a flowchart of a detailed illustrative process for generating for display a summary of the set of plot segments representing the difference between the first sequence of plot segments and the second sequence of plot segments in accordance with some embodiments of the disclosure.

FIG. 13 is a flowchart of a detailed illustrative process for generating for display a summary of the set of plot segments representing the difference between the first sequence of plot segments and the second sequence of plot segments in accordance with some embodiments of the disclosure. It should be noted that process 1300 or any step thereof could be performed on, or provided by, any of the devices shown in FIGS. 5-6. For example, process 1300 may be executed by control circuitry 504 (FIG. 5) as instructed by a media guidance application implemented on a user device (e.g., user equipment devices 602, 604, and/or 606 (FIG. 6)) in order to generate for display a summary of the set of plot segments representing the difference between the sequences of plot segments. In addition, one or more steps of process 1300 may be incorporated into or combined with one or more steps of any other process or embodiment described herein.

At step 1310, the process for generating for display a summary of the set of plot segments representing the difference between the first sequence of plot segments and the second sequence of plot segments is begun. For example, the first sequence of plot segments may correspond to the movie version of "Harry Potter and the Sorcerer's Stone," and the second sequence of plot segments may correspond to the e-book version of "Harry Potter and the Sorcerer's Stone."

At step 1320, a determination is made as to whether the set of plot segments includes content that violates a parental control setting. In response to determining that the set of plot segments includes content that violates a parental control setting, the process proceeds to step 1330. Otherwise, the process proceeds to step 1340. For example, the media guidance application may determine through a machine learning technique that the set of plot segments representing the difference between the movie and e-book versions of "Harry Potter and the Sorcerer's Stone" includes a plot segment that violates a parental control setting that has been set by the user.

At step 1330, the summary is prevented from being presented in response to determining the set of plot segments includes content that violates a parental control setting. For example, the media guidance application may prevent the summary of differences from being presented to the user and instead display a notification that indicates that the summary is being prevented from being displayed because of content that violates a parental control setting.

At step 1340, the summary is generated for display. For example, the media guidance application may generate the summary for display, remove plot segments that violate a parental control setting, and display the summary with those plot segments omitted on the screen of the user device.

At step 1350, a reaction of the user to the summary is determined. For example, the media guidance application may determine by using speech recognition on the user's exclamations that the user reacted to the summary with disappointment over a particular plot segment in the e-book version of "Harry Potter and the Sorcerer's Stone" not being included in the movie version.

At step 1360, another story that includes a similar set of differences in plot sequences as the selected story is searched for. For example, if the media guidance application has determined that the movie version of "Harry Potter and the Sorcerer's Stone" has many fewer plot segments than the e-book version, the media guidance application may search a database for another story that has one available version with many fewer plot segments than a second available version.

At step 1370, a determination is made as to whether another story that includes a similar set of differences in sequences as the selected story has been identified. In response to determining that another story that includes a similar set of differences in sequences as the selected story has been identified, the process proceeds to step 1370. Otherwise, the process proceeds to step 1310. For example, the media guidance application may determine that it has found another story that includes a similar set of differences in sequences as the movie and e-book versions of "Harry Potter and the Sorcerer's Stone."

At step 1380, another media asset representing the other story is recommended at a point in time in which a schedule of the user indicates the user has availability to access the other media asset. For example, the media guidance application may identify a media asset to recommend to the user and search for availability in the user's calendar that is long enough to accommodate the user consuming the media asset, during which it will make the recommendation.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIG. 13.

What is claimed is:

1. A method to alert users to differences between first and second media versions of a story, the method comprising:
receiving a user selection of a media asset;

determining that the media asset is available in first and second versions, respectively;

retrieving a first set of metadata associated with the first version of the media asset, the first metadata identifying a first sequence of plot segments that collectively represent a story arc in the first version of the media asset;

retrieving a unique identifier associated with the story arc in both the first version and the second version of the media asset;

determining a first plot segment in the first sequence represents a resolution to the story arc in the first version of the media asset based on detecting the unique identifier;

retrieving a second set of metadata associated with the second version of the media asset, the second metadata identifying a second sequence of plot segments that collectively represent the story arc in the second version of the media asset;

comparing the first sequence of plot segments with the second sequence of plot segments to identify a set of plot segments representing a difference between the first sequence of plot segments and the second sequence of plot segments;

while the first version of the media asset is being accessed by the user, determining whether a given plot segment in the first sequence associated with a current play position corresponds to the first plot segment;

in response to determining the given plot segment in the first sequence associated with the current play position corresponds to the first plot segment, detecting that the user, accessing the first version of the media asset, has reached the plot segment that represents the resolution to the story arc in the first version of the media asset; and in response to detecting that the user has reached the plot segment that represents the resolution to the story arc in the first version of the media asset, generating for display a summary of the set of plot segments representing the difference between the first sequence of plot segments and the second sequence of plot segments.

2. The method of claim 1, wherein the first version comprises an e-book and the second version comprises a movie, wherein retrieving the first and second set of metadata comprises searching metadata associated with the first and second versions of the media asset to identify a set of metadata having story identifiers that match the unique identifier.

3. The method of claim 2, wherein searching metadata comprises:

searching at least one of an online database, a social network, a blog, and subtitles associated with the second version of the media asset for information that describes scenes or chapters in the story; and generating metadata using the description of the scenes and the unique identifier.

4. The method of claim 1 further comprising:

in response to comparing the first sequence of plot segments with the second sequence of plot segments, determining that the second sequence of plot segments includes fewer plot segments than the first sequence;

generating the set of plot segments by selecting the plot segments in the first sequence that are not included in the second sequence; and retrieving metadata associated with the set of plot segments that describes content in the set of plot segments with an indication that the first version of the media asset includes a plot point that is not in the second version of the media asset.

5. The method of claim 4, wherein generating for display the summary comprises at least one of presenting the set of plot segments to a user and generating a textual representation of the retrieved metadata.

6. The method of claim 1 further comprising:

in response to comparing the first sequence of plot segments with the second sequence of plot segments, determining that the second sequence of plot segments includes more plot segments than the first sequence;

generating the set of plot segments by selecting the plot segments in the second sequence that are not included in the first sequence; and retrieving metadata associated with the set of plot segments that describes content in the set of plot segments with an indication that the second version of the media asset includes a plot point that is not in the first version of the media asset.

7. The method of claim 1 further comprising:

in response to comparing the first sequence of plot segments with the second sequence of plot segments, identifying a first plot segment in the first sequence of plot segments that has a plot descriptor that matches in part a second plot segment in the second sequence of plot segments;

retrieving a portion of the plot descriptor that is in the first plot segment and is not in the second plot segment; and generating the set of plot segments by selecting the portion of the plot descriptor.

8. The method of claim 1 further comprising:

in response to comparing the first sequence of plot segments with the second sequence of plot segments, accessing a social network to identify a set of social commentary that relates to the difference between the first sequence of plot segments and the second sequence of plot segments; and adding the set of social commentary to the summary.

9. The method of claim 1 further comprising:

determining whether the set of plot segments includes content that violates a parental control setting; and preventing the summary from being presented in response to determining the set of plot segments includes content that violates a parental control setting.

10. The method of claim 1 further comprising:

determining a reaction of the user to the summary;

searching for another story that includes a similar set of differences in plot sequences as the selected story;

recommending another media asset representing the another story at a point in time in which a schedule of the user indicates the user has availability to access the another media asset.

11. A system to alert users to differences between first and second media versions of a story, the system comprising:

control circuitry configured to:

receive a user selection of a media asset;

determine that the media asset is available in first and second versions, respectively;

retrieve a first set of metadata associated with the first version of the media asset, the first metadata identifying a first sequence of plot segments that collectively represent a story arc in the first version of the media asset;

retrieve a unique identifier associated with the story arc in both the first version and the second version of the media asset;

determine a first plot segment in the first sequence represents a resolution to the story arc in the first version of the media asset based on detecting the unique identifier;

retrieve a second set of metadata associated with the second version of the media asset, the second metadata identifying a second sequence of plot segments that collectively represent the story arc in the second version of the media asset;

compare the first sequence of plot segments with the second sequence of plot segments to identify a set of plot segments representing a difference between the first sequence of plot segments and the second sequence of plot segments;

while the first version of the media asset is being accessed by the user, determine whether a given plot segment in the first sequence associated with a current play position corresponds to the first plot segment;

in response to determining the given plot segment in the first sequence associated with the current play position corresponds to the first plot segment, detect that the user, accessing the first version of the media asset, has reached the plot segment that represents the resolution to the story arc in the first version of the media asset; and in response to detecting that the user has reached the plot segment that represents the resolution to the story arc in the first version of the media asset, generate for display a summary of the set of plot segments representing the difference between the first sequence of plot segments and the second sequence of plot segments.

12. The system of claim 11, wherein the first version comprises an e-book and the second version comprises a movie, wherein the control circuitry is configured to retrieve the first and second set of metadata by searching metadata associated with the first and second versions of the media asset to identify a set of metadata having story identifiers that match the unique identifier.

13. The system of claim 12, wherein the control circuitry is configured to search metadata by:

searching at least one of an online database, a social network, a blog, and subtitles associated with the second version of the media asset for information that describes scenes or chapters in the story; and generating metadata using the description of the scenes and the unique identifier.

14. The system of claim 11, wherein the control circuitry is further configured to:

in response to comparing the first sequence of plot segments with the second sequence of plot segments, determine that the second sequence of plot segments includes fewer plot segments than the first sequence;

generate the set of plot segments by selecting the plot segments in the first sequence that are not included in the second sequence; and retrieve metadata associated with the set of plot segments that describes content in the set of plot segments with an indication that the first version of the media asset includes a plot point that is not in the second version of the media asset.

15. The system of claim 14, wherein the control circuitry is configured to generate for display the summary by at least one of presenting the set of plot segments to a user and generating a textual representation of the retrieved metadata.

16. The system of claim 11, wherein the control circuitry is further configured to:

in response to comparing the first sequence of plot segments with the second sequence of plot segments, determine that the second sequence of plot segments includes more plot segments than the first sequence;

generate the set of plot segments by selecting the plot segments in the second sequence that are not included in the first sequence; and retrieve metadata associated with the set of plot segments that describes content in the set of plot segments with an indication that the second version of the media asset includes a plot point that is not in the first version of the media asset.

17. The system of claim 11, wherein the control circuitry is further configured to:

in response to comparing the first sequence of plot segments with the second sequence of plot segments, identify a first plot segment in the first sequence of plot segments that has a plot descriptor that matches in part a second plot segment in the second sequence of plot segments;

retrieve a portion of the plot descriptor that is in the first plot segment and is not in the second plot segment; and generate the set of plot segments by selecting the portion of the plot descriptor.

18. The system of claim 11, wherein the control circuitry is further configured to:

in response to comparing the first sequence of plot segments with the second sequence of plot segments, access a social network to identify a set of social commentary that relates to the difference between the first sequence of plot segments and the second sequence of plot segments; and add the set of social commentary to the summary.

19. The system of claim 11, wherein the control circuitry is further configured to:

determine whether the set of plot segments includes content that violates a parental control setting; and prevent the summary from being presented in response to determining the set of plot segments includes content that violates a parental control setting.

20. The system of claim 11, wherein the control circuitry is further configured to:

determine a reaction of the user to the summary;

search for another story that includes a similar set of differences in plot sequences as the selected story;

recommend another media asset representing the another story at a point in time in which a schedule of the user indicates the user has availability to access the another media asset.

* * * * *